US012764786B2

(12) United States Patent
Pan et al.

(10) Patent No.: US 12,764,786 B2
(45) Date of Patent: Oct. 13, 2026

(54) RADIO SIDELINK SENSING

(71) Applicant: INTERDIGITAL PATENT HOLDINGS, INC., Wilmington, DE (US)

(72) Inventors: Kyle Pan, Saint James, NY (US); Guodong Zhang, Woodbury, NY (US); Pascal Adjakple, Great Neck, NY (US); Patrick Svedman, Stockholm (SE); Allan Tsai, Boonton, NJ (US); Jerome Vogedes, Milwaukee, WI (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 269 days.

(21) Appl. No.: 18/554,003

(22) PCT Filed: Mar. 25, 2022

(86) PCT No.: PCT/US2022/021940
§ 371 (c)(1),
(2) Date: Oct. 5, 2023

(87) PCT Pub. No.: WO2022/216466
PCT Pub. Date: Oct. 13, 2022

(65) Prior Publication Data
US 2024/0172280 A1 May 23, 2024

Related U.S. Application Data

(60) Provisional application No. 63/170,703, filed on Apr. 5, 2021.

(51) Int. Cl.
*H04W 74/0808* (2024.01)
*H04L 5/00* (2006.01)
(Continued)

(52) U.S. Cl.
CPC ....... *H04W 74/0808* (2013.01); *H04L 5/0051* (2013.01); *H04W 56/0015* (2013.01); *H04W 74/002* (2013.01); *H04W 92/18* (2013.01)

(58) Field of Classification Search
None
See application file for complete search history.

(56) References Cited

U.S. PATENT DOCUMENTS 11,425,552 B2 * 8/2022 Kim ...................... H04W 8/005
11,979,780 B2 * 5/2024 Tseng ............... H04W 36/0061
(Continued)

FOREIGN PATENT DOCUMENTS

CN 112544091 A 3/2021
EP 3840430 A1 6/2021
WO 2020/036454 A1 2/2020

*Primary Examiner* — Eunsook Choi
(74) *Attorney, Agent, or Firm* — Flaster Greenberg P.C.

(57) ABSTRACT

The performance of user equipment (UE) using sidelink radio communications may be improved by providing the UE with sidelink configuration information pertaining to modes, functions, channels, signals, and/or resources for use in sidelink communications. For example, a UE may receive information indicating a sidelink mode, e.g., a transmit-only, receive-only, or a transmit and receive mode. Sidelink configuration may include indications of signals and/or channels for use in sidelink transmit and/or receive communications, etc.

20 Claims, 20 Drawing Sheets

(51) Int. Cl.

| | |
|---|---|
| ***H04W 56/00*** | (2009.01) |
| ***H04W 74/00*** | (2009.01) |
| *H04W 92/18* | (2009.01) |

(56) References Cited

U.S. PATENT DOCUMENTS

| | | | | |
|---|---|---|---|---|
| 12,238,767 | B2 * | 2/2025 | Uziel | H04W 72/20 |
| 12,363,750 | B2 * | 7/2025 | Shin | H04L 5/0053 |
| 12,418,329 | B2 * | 9/2025 | Shin | H04B 17/318 |
| 2020/0153574 | A1 | 5/2020 | Shin et al. | |
| 2020/0178290 | A1 * | 6/2020 | Lee | H04W 72/20 |
| 2020/0314910 | A1 * | 10/2020 | Höglund | H04W 48/10 |
| 2020/0322095 | A1 | 10/2020 | Park et al. | |
| 2021/0297841 | A1 * | 9/2021 | Jung | H04W 4/12 |
| 2022/0399917 | A1 * | 12/2022 | Shin | H04L 1/1858 |

* cited by examiner

RADIO SIDELINK SENSING

CROSS-REFERENCE TO RELATED APPLICATIONS

This application is the National Stage Application of International Patent Application No. PCT/US2022/021940, filed Mar. 25, 2022, which claims the benefit of U.S. Provisional Patent Application No. 63/170,703, filed on Apr. 5, 2021, titled "New Radio Sidelink Sensing," the content of which is hereby incorporated by reference herein.

BACKGROUND

This disclosure pertains to wireless systems such as those described in the 3GPP TR 22.886 Study on enhancement of 3GPP Support for 5G V2X Services, Release 16, V16.2.0 and 3GPP TS 22.186 Enhancement of 3GPP support for V2X scenarios (Stage 1), Release 16, V16.2.0.

SUMMARY

The performance of user equipment (UE) using sidelink radio communications may be improved by providing the UE with sidelink configuration information pertaining to modes, functions, channels, signals, and/or resources for use in sidelink communications. For example, a UE may receive an indication, activation, and/or configuration from the gNB, network, or another UE pertaining to which signal and/or channels that the UE should use for sidelink reception and/or transmission. For example, to save power, the UE may be instructed to use one or more of S-SSB, PSFCH, PSCCH-DMRS, PSSCH-DMRS, etc., while avoiding the use of others. A gNB or vehicle group leader, for instance, may have more information than is readily available to the UE, and thereby may be able to provide guidance to the UE for better use of UE internal resources and/or radio resources in the environment of the UE. Similarly, a UE may receive reception from the network an indication of a function to enable/disable for sidelink reception and/or transmission.

For purposes of communicating such parameters, the network may maintain a plurality of UE types/categories that may be identified based on functions or features used for various kinds of transmission and/or reception, and/or based on UE capabilities.

UEs may be arranged to trigger random resource selection based on detected conditions, such as CBR, QoS, priority, ACK and/or NACK, SL-RSRP, SL-RSSI, traffic type, service type, measurement, data rate, SNR, SINR, CR, etc., e.g., as compared to thresholds.

Resource selection may be non-uniformly random, e.g., weighted random, rather than uniformly random. Some resources may be selected with lower probability for non-random resource selection UEs. For example, in one extreme, some resources may be exclusively reserved for random resource selection by the UE (whereby probability for non-random resource selection UEs is zero) even where this is a less efficient use of resources. By configuring or indicating different weights of resource selection criteria per resource, trade-offs between collisions and resource utilization efficiency—and performance—may be enhanced.

UE sensing capabilities may be employed for random resource selection, e.g., via PSCCH decoding, PSCCH-DMRS measurements, and/or PSSCH-DMRS measurements. Such may be enabled or disabled while other receptions are disabled, for example.

If PSCCH is enabled, then preemption in SCI may be used. If PSCCH-DMRS is enabled, then interference measurement may be used. If PSSCH-DMRS is enabled, then more accurate interference measurement may be used.

Operations may be SCI-based only, measurement-only based, or use both SCI and measurements. Sensing may be contiguous-only partial sensing or periodic-only partial sensing, for example. There are trade-offs between collision probability, decoding, measurement accuracy, and power.

For UE reception from the network, various types of sensing may be used, e.g., random resource selection, partial sensing, and full sensing. For example, contiguous or periodic-based partial sensing may be used.

The UE may autonomously determination a sensing type and scheme, e.g., based on conditions such as CBR, QoS, ACK and/or NACK, SL-RSRP, SL-RSSI, traffic type, service type, priority, measurement, data rate, SNR or SINR, CR, etc. These may be used to trigger partial sensing such as contiguous partial sensing or periodic-based partial sensing, for example, as well as sensing type and procedure based on conditions, criteria, measurements, and/or rules. Detection of number of ACKs and/or NACKs on PSFCH may also be used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Services and Requirements

Figure 1:
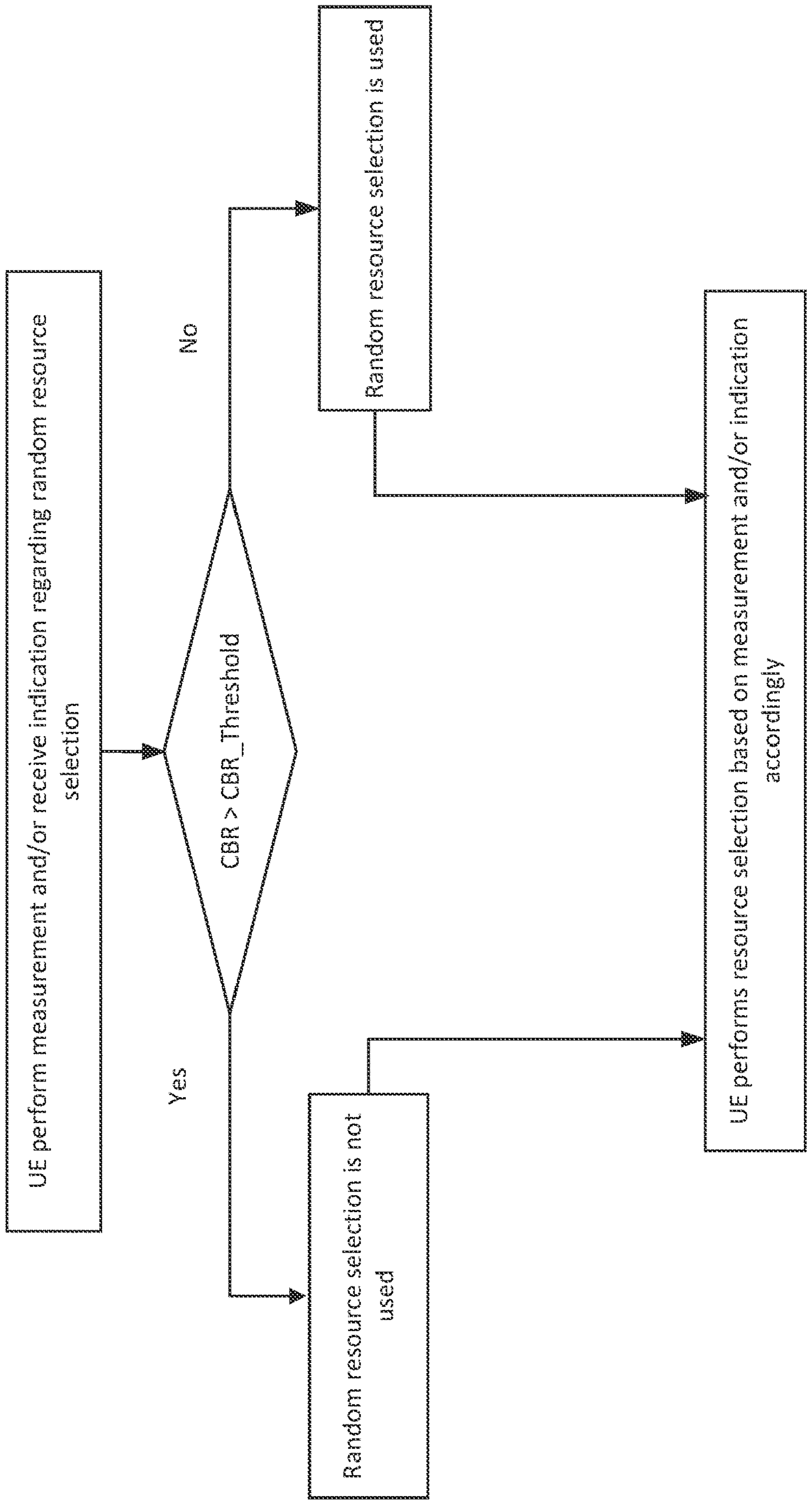
FIG. 1 is a flow chart of an example of random resource selection based on CBR in NR Sidelink.

NR V2X is designed with a broader set of more advanced V2X use cases in mind and are broadly arranged into four use case groups: vehicular platooning, extended sensors, advanced driving, and remote driving.

Vehicle platooning enables the vehicles to dynamically form a platoon travelling together. All the vehicles in the platoon obtain information from the leading vehicle to manage this platoon. This information allows the vehicles to drive closer than normal in a coordinated manner, going the same direction and travelling together.

Extended sensors enable the exchange of raw or processed data gathered through local sensors or live video images among vehicles, road site units, devices of pedestrian, and V2X application servers. The vehicles can increase the perception of their environment beyond what their own sensors can detect and have a more broad and holistic view of the local situation. High data rate is one of the key characteristics.

Advanced driving enables semi-automated or full-automated driving. Each vehicle and/or RSU shares its own perception data obtained from its local sensors with vehicles in proximity that allows vehicles to synchronize and coordinate their trajectories or maneuvers. Each vehicle also shares its driving intention with vehicles in their proximity.

Remote driving enables a remote driver or a V2X application to operate a remote vehicle for those passengers who cannot drive by themselves, or remote vehicles located in dangerous environments. For a case where variation is limited and routes are predictable, such as public transportation, driving based on cloud computing can be used. High reliability and low latency are the main requirements.

The most demanding requirements set are for a maximum sidelink range of 1000 m, a maximum throughput of 1 Gbps, a shortest latency of 3 ms, a maximum reliability of 99.999%, and a maximum transmission rate of 100 messages/second. However, there is not a use case which, on its own, demands all of these bounding requirements. There are also requirements relating to security, integrity, authorization, and privacy.

NR V2X

NR V2X has physical layer support for broadcast, unicast, and groupcast sidelink operations. The addition of unicast and groupcast is linked with the introduction of sidelink HARQ feedback, high order modulation, sidelink CSI, and PC5-RRC, etc.

Physical Sidelink Channels and Signals

The NR V2X sidelink uses the following physical channels and signals: Physical sidelink broadcast channel (PSBCH) and its DMRS; Physical sidelink control channel (PSCCH) and its DMRS; Physical sidelink shared channel (PSSCH) and its DMRS; Physical sidelink feedback channel (PSFCH); Phase-tracking reference signal (PT-RS) in FR2; Channel state information reference signal (CSI-RS) and Sidelink primary and secondary synchronization signals (S-PSS and S-SSS) which are organized into the sidelink synchronization signal block (S-SSB) together with PSBCH. S-PSS and S-SSS can be referred to jointly as the sidelink synchronization signal (SLSS).

NR-V2X sidelink supports subcarrier spacings of 15, 30, 60, and 120 kHz. Their associations to CPs and frequency ranges are as for NR UL/DL but using only the CP-OFDM waveform. The modulation schemes available are QPSK, 16-QAM, 64-QAM, and 256-QAM.

PSBCH transmits the SL-BCH transport channel, which carries the sidelink V2X Master Information Block (MIB-V2X) from the RRC layer. When in use, PSBCH transmits MIB-V2X every 160 ms in 11 RBs of the SL bandwidth, with possible repetitions in the period. DMRS associated with PSBCH are transmitted in every symbol of the S-SSB slot. S-PSS and S-SSS are transmitted together with PSBCH in the S-SSB. They jointly convey the SLSS ID used by the UE.

Sidelink control information (SCI) in NR V2X is transmitted in two stages. The first-stage SCI is carried on PSCCH and contains information to enable sensing operations, as well as information about the resource allocation of the PSSCH.

PSSCH transmits the second-stage SCI and the SL-SCH transport channel. The second-stage SCI carries information needed to identify and decode the associated SL-SCH, as well as control for HARQ procedures, and triggers for CSI feedback, etc. SL-SCH carries the TB of data for transmission over SL.

The resources in which PSSCH is transmitted can be scheduled or configured by a gNB or determined through a sensing procedure conducted autonomously by the transmitting UE. A given TB can be transmitted multiple times. DMRS associated with rank-1 or rank-2 PSSCH can be transmitted in 2, 3, or 4 sidelink symbols distributed through a sidelink slot. Multiplexing between PSCCH and PSSCH is in time and frequency within a slot.

PSFCH carries HARQ feedback over the sidelink from a UE which is an intended recipient of a PSSCH transmission (henceforth an Rx UE) to the UE which performed the transmission (henceforth a Tx UE). Sidelink HARQ feedback may be in the form of conventional ACK/NACK, or NACK-only with nothing transmitted in case of successful decoding. PSFCH transmits a Zadoff-Chu sequence in one PRB repeated over two OFDM symbols, the first of which can be used for AGC, near the end of the sidelink resource in a slot. The time resources for PSFCH are (pre-)configured to occur once in every 1, 2, or 4 slots.

Resource Allocation Mode 1

Mode 1 is for resource allocation by gNB. The use cases intended for NR V2X can generate a diverse array of periodic and aperiodic message types. Therefore, resource allocation mode 1 provides dynamic grants of sidelink resources from a gNB, as well as grants of periodic sidelink resources configured semi-statically by RRC.

A dynamic sidelink grant DCI can provide resources for one or multiple transmissions of a transport block in order to allow control of reliability. The transmission(s) can be subject to the sidelink HARQ procedure if that operation is enabled.

A sidelink configured grant can be such that it is configured once and can be used by the UE immediately, until it is released by RRC signaling (known as Type 1). A UE is allowed to continue using this type of sidelink configured grant when beam failure or physical layer problems occur in NR Uu until an RLF detection timer expires, before falling back to an exception resource pool. The other type of sidelink configured grant, known as Type 2, is configured once but cannot be used until the gNB sends the UE a DCI indicating it is now active, and only until another DCI indicates de-activation. The resources in both types are a set of sidelink resources recurring with a periodicity which a gNB will desire to match to the characteristics of the V2X traffic. Multiple configured grants can be configured, to allow provision for different services, traffic types, etc.

MCS information for dynamic and configured grants can optionally be provided or constrained by RRC signaling instead of the traditional DCI. RRC can configure the exact MCS the Tx UE uses, or a range of MCS. It may also be left unconfigured. For the cases where RRC does not provide the exact MCS, the transmitting UE is left to select an appropriate MCS itself based on the knowledge it has of the TB to be transmitted and, potentially, the sidelink radio conditions.

Resource Allocation Mode 2

Mode 2 is for UE autonomous resource selection. Its basic structure is of a UE sensing, within a (pre-)configured resource pool, which resources are not in use by other UEs with higher priority traffic and choosing an appropriate amount of such resources for its own transmissions. Having selected such resources, the UE can transmit and re-transmit in them a certain number of times, or until a cause of resource reselection is triggered.

The mode 2 sensing procedure can select and then reserve resources for a variety of purposes reflecting that NR V2X introduces sidelink HARQ in support of unicast and groupcast in the physical layer. It may reserve resources to be used for a number of blind (re-)transmissions or HARQ-feedback-based (re-)transmissions of a transport block, in which case the resources are indicated in the SCI(s) scheduling the transport block. Alternatively, it may select resources to be used for the initial transmission of a later transport block, in which case the resources are indicated in an SCI scheduling a current transport block. Finally, an initial transmission of a transport block can be performed after sensing and resource selection, but without a reservation.

The first-stage SCIs transmitted by UEs on PSCCH indicate the time-frequency resources in which the UE will transmit a PSSCH. These SCI transmissions are used by sensing UEs to maintain a record of which resources have been reserved by other UEs in the recent past.

The sensing UE then selects resources for its (re-)transmission(s) from within a resource selection window. The window starts shortly after the trigger for (re-)selection of resources and cannot be longer than the remaining latency budget of the packet due to be transmitted. Reserved resources in the selection window with SL-RSRP above a threshold are excluded from being candidates by the sensing UE, with the threshold set according to the priorities of the traffic of the sensing and transmitting UEs. Thus, a higher priority transmission from a sensing UE can occupy resources which are reserved by a transmitting UE with sufficiently low SL-RSRP and sufficiently lower-priority traffic.

Problem 1 (Enhanced Random Resource Selection)

Random resource selection can be used to save power. Since sensing is not required for random resource selection, the power consumption caused by constant sensing could be avoided and power saving could be achieved. However, random resource selection could cause more collisions. Due to high volume of collisions, reliability could decrease, and latency could increase. In addition, data needs to be retransmitted which results in more power consumption.

Random resource selection may not have sensing functionality. When the NR Sidelink system is operating in mixed resources where different sensing types of UEs such as partial sensing or full sensing UEs may coexist, how to avoid or reduce collisions between UEs need to be considered. Full sensing UE may avoid collisions due to features such as extended sensing window, re-evaluation, and pre-emption capabilities. In comparison to full sensing, partial sensing UE may not reduce or avoid collision as much as full sensing as result of a smaller sensing window or smaller size of sensing measurement samples and no use of pre-emption, but still may help somewhat reduce or mitigate collisions. Random resource selection UE cannot avoid or reduce collisions due to no sensing capability. Solutions of enhancement to random resource selection are required to mitigate collision or collision impact to enable power saving as well as enhance reliability and reduced latency.

Problem 2 (Enhanced Partial Sensing)

In Rel-16, resource allocation mode 2 is supported. However, in Rel-17, enhancement is required for resource allocation to reduce power consumption as well as enhance reliability and latency. Partial sensing could be used to reduce power consumption. However, due to the fact that resource sensing is performed partially, the occupied resources may not be fully sensed. Therefore, collisions arising from partial sensing could increase. For aperiodic traffic, partial sensing may not be able to capture these types of traffic. Transmit UE could collide with aperiodic traffic if it cannot sense the aperiodic traffic. It is important to enhance partial sensing such that collisions could be reduced while power saving could still be achieved. Reliability and latency should be maintained for partial sensing. Solutions for enhanced partial sensing is desirable and required.

Enhanced Random Resource Selection

Random resource selection may be applicable to both periodic and aperiodic transmissions. Conditions for random resource selection may be based on certain criteria and/or rule(s). For example, channel conditions, occupancy conditions, quality, or the like may be used to trigger random resource selection. Whether to use random resource selection or not may be based on channel busy ratio (CBR), QoS, priority, Channel Occupancy Ratio (CR), etc. Whether to use random resource selection or not may be configured by gNB or another UE, e.g., a manager or leader of a group UEs or a RSU, semi-persistent activated by gNB or another UE, e.g., a manager or leader of a group UEs or a RSU, or activated or indicated by gNB or another UE, e.g., a manager or leader of a group UEs or a RSU.

An example enhanced random resource selection is depicted in FIG. 1. UE may perform measurement or receive indication, activation/deactivation, and/or configuration from gNB for random resource selection. Indication may indicate whether to use random resource selection, parameter(s), or measurement(s) to use for random resource selection, or the like. UE may compare channel busy ratio (CBR); if CBR is above a threshold (CBR_Threshold) which may be configured or preconfigured, then random resource selection is not used. Otherwise, if CBR is not greater than the threshold (CBR_Threshold) or below the threshold (CBR_Threshold), random resource selection is used. UE may perform random resource selection based on the decision accordingly.

Figure 2:
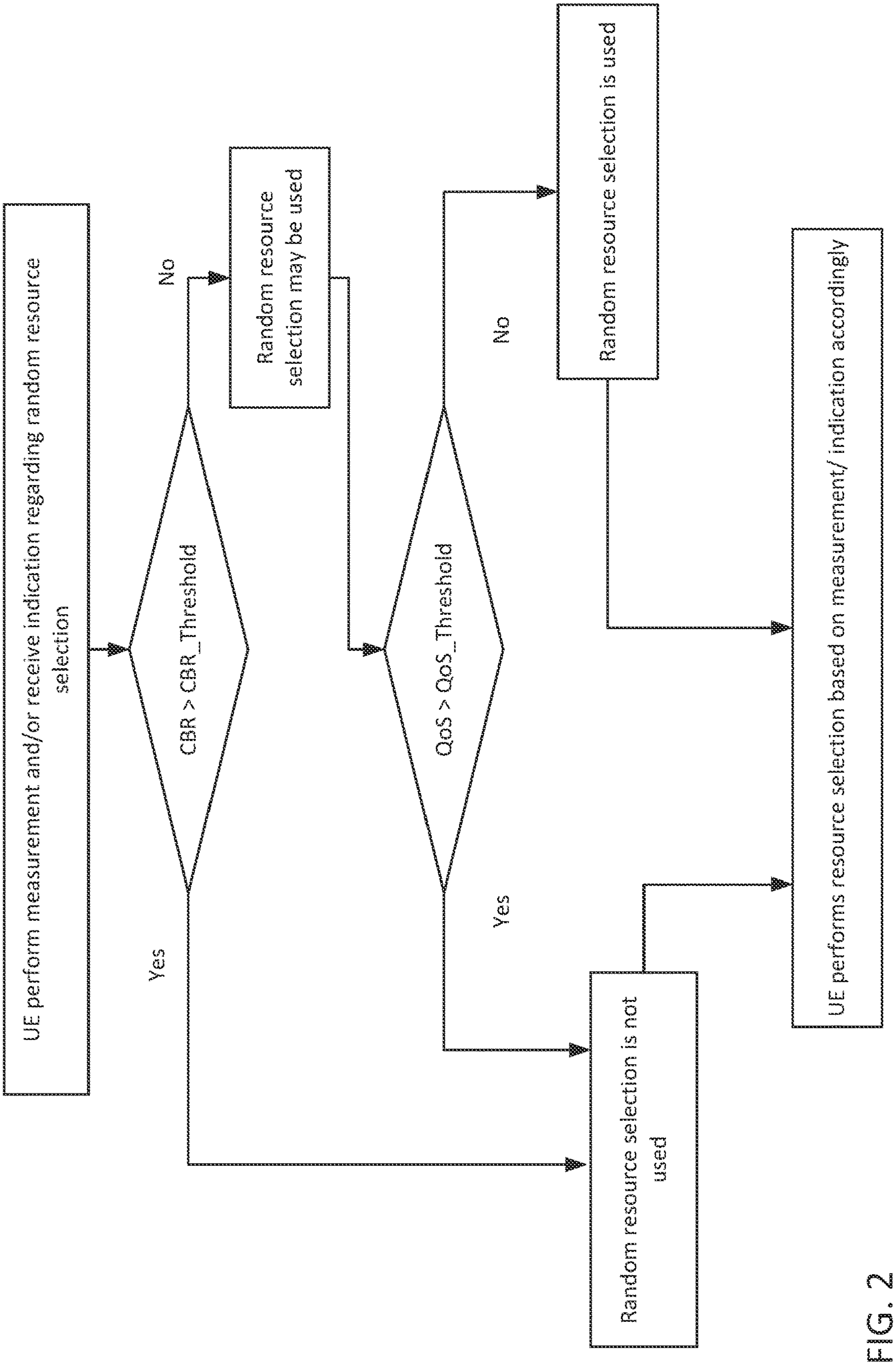
FIG. 2 is a flow chart of an example of random resource selection based on CBR and QoS in NR Sidelink.

Another example of enhanced random resource selection is depicted in FIG. 2. UE may perform measurements or receive an indication, activation/deactivation, and/or configuration from the gNB for random resource selection. UE may compare channel busy ratio (CBR); if CBR is above a threshold (CBR_Threshold) which may be configured or preconfigured, then random resource selection is not used. Otherwise, if CBR is not greater than the threshold (CBR- _Threshold) or below the threshold (CBR_Threshold), random resource selection may or may not be used. The use of random resource selection may be determined based on a second parameter, for example, QoS. QoS may be provided by higher layer. If QoS is greater than a threshold (QoS_Threshold), then random resource is not used. If QoS is not greater than the threshold (QoS_Threshold) or below the threshold (QoS_Threshold), then random resource selection is used. UE may perform random resource selection based on the decision accordingly.

Figure 3:
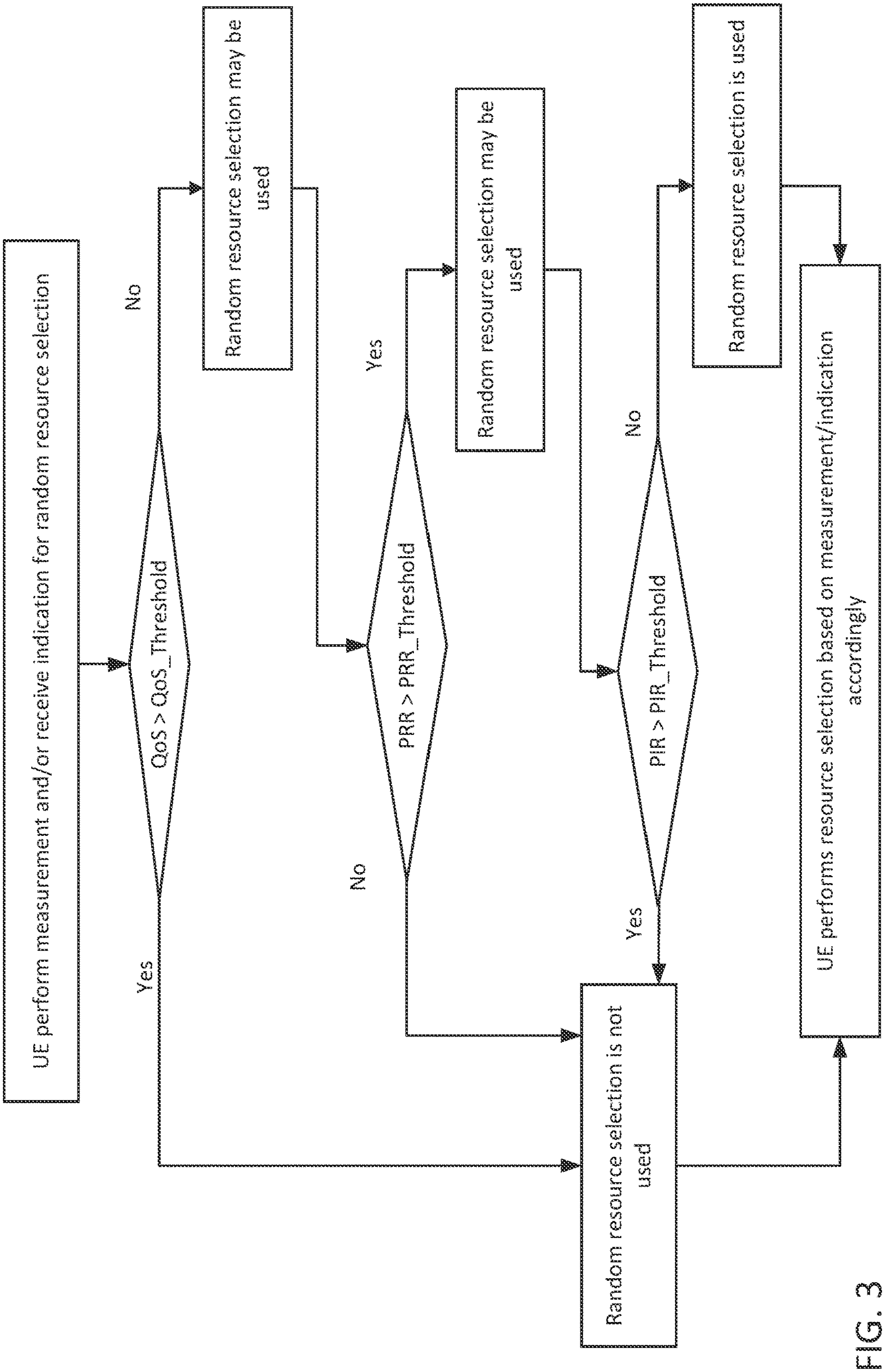
FIG. 3 is a flow chart of an example of random resource selection based on QoS, PRR and PIR in NR Sidelink.

Yet another example of enhanced random resource selection based on QoS, PIR, and PRR in NR Sidelink is depicted in FIG. 3.

UE may perform measurements or receive an indication, activation/deactivation, and/or configuration from the gNB for random resource selection. UE may compare QoS, if QoS is above a threshold (QoS_Threshold) which may be configured or preconfigured, then random resource selection is not used. Otherwise, if QoS is not greater than the threshold (QoS_Threshold) or below the threshold (QoS_Threshold), random resource selection may or may not be used. The use of random resource selection may be further determined based on a second parameter; in this example it is PRR. If PRR is not greater than the threshold (PRR_Threshold) or below the threshold (PRR_Threshold), then random resource selection is not used.

If PRR is greater than a threshold (PRR_Threshold), then random resource selection may or may not be used. The use of random resource selection may be further determined based on a third parameter; in this example it is PIR. If PIR is greater than the threshold (PIR_Threshold), then random resource selection is not used. If PIR is not greater than or below the threshold (PIR_Threshold), then random resource selection is used. UE may perform random resource selection based on the measurement and/or indication accordingly.

Packet reception ratio (PRR) may be related to reliability or the like. Packet Inter-Reception (PIR) may be related to latency or the like. For example, PRR may be defined as follows: for one Tx packet, the PRR is calculated by X/Y, where Y is the number of UE/vehicles that located in the range (a, b) from the TX, and X is the number of UE/vehicles with successful reception among Y. Alternatively, for one Tx packet, the PRR is calculated by S/Z, where Z is the number of UEs in the intended set of receivers, and S is the number of UE with successful reception among Z. PIR may be defined as follows: For a given distance D, PIR is the time Ti elapsed between two successive successful receptions of two different packets transmitted from node A to node B for the same application, if the distances at the two packets' receiving time between node A and node B is within the range of (0,D]. Alternatively, PIR is the time Ti elapsed between two successive successful receptions of two different packets transmitted from node A to node B for the same application, if the node B is one of the intended set of receivers of the node A.

The above examples may be extended to multi-thresholds and/or multiple parameters and measurements. Random resource (RR) measurements may be based on CBR, SL L1-RSRP, SL L1-RSSI, etc. RR measurements may be based on pre-detection such as resource reservation in SCI. RR measurements may be based on post-detection such as detection and/or decoding results. Post-detection RR measurements may be based on HARQ ACK and/or NACK, such as number of ACKs, number of NACKs, ACK percentage, NACK percentage, ACK/NACK ratio, or the like, or combination of them. RR measurements may also be based on combination of pre-detection and post detection RR measurement, detection, and decoding results.

Figure 4:
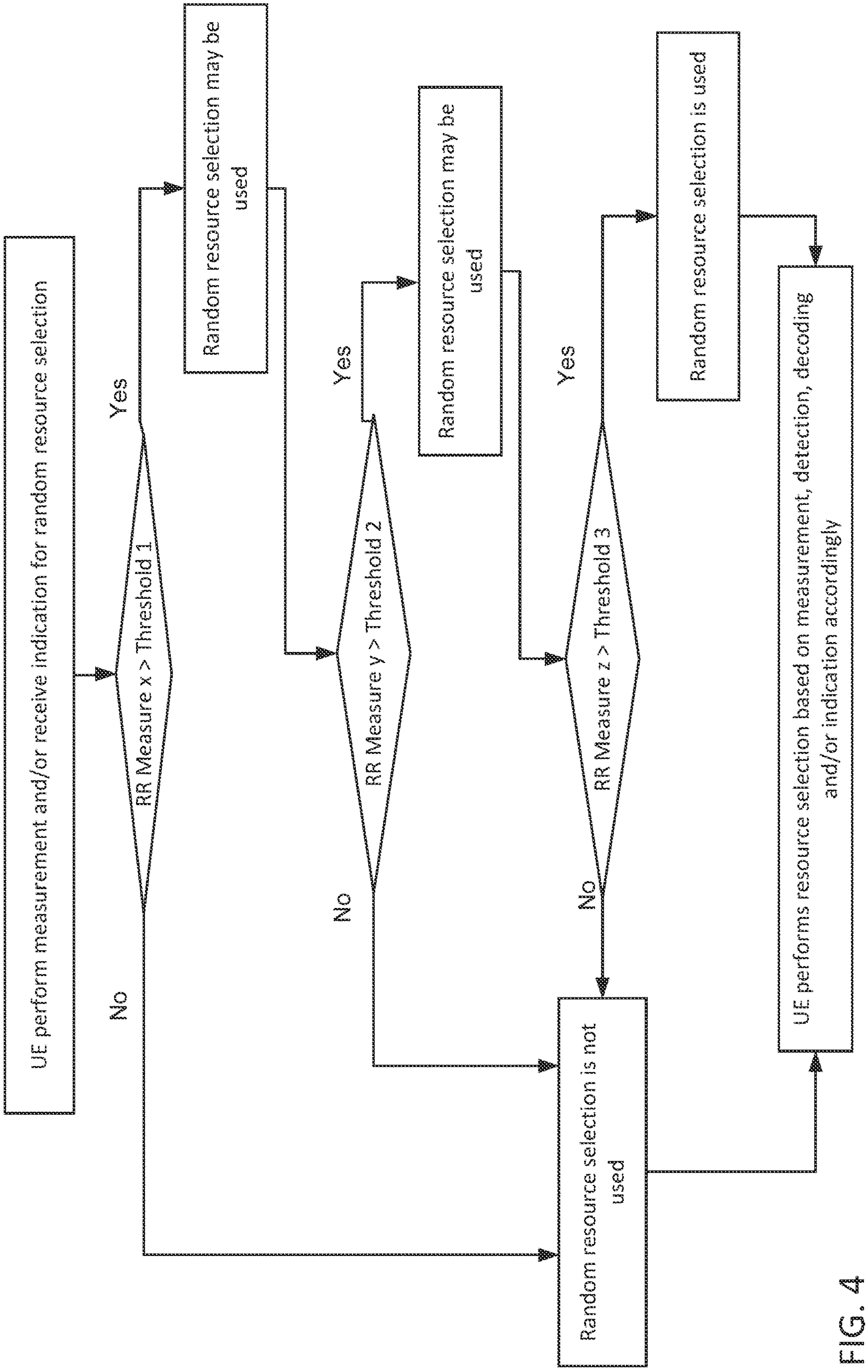
FIG. 4 is a flow chart of an example of random resource selection based on random resource (RR) measurements in NR Sidelink.

An example of enhanced random resource selection based on RR measurements in NR Sidelink is depicted in FIG. 4.

UE may perform multiple measurements or receive indication, activation/deactivation, and/or configuration from gNB for random resource selection. UE may compare the first measurement (say measure x). If the first measurement is below a first threshold, which may be configured or preconfigured, then random resource selection is not used. Otherwise, if the first measurement is greater than the first threshold, random resource selection may or may not be used. The use of random resource selection may be determined based on a second measurement (say measure y).

If the second measurement is not greater than the threshold or below the threshold, then random resource selection is not used. Otherwise, if the second measurement is greater than the second threshold, random resource selection may or may not be used. The use of random resource selection may be further determined based on a third measurement (say measure z).

If the third measurement is not greater than the threshold or below the threshold, then random resource selection is not used. Otherwise, if the third measurement is greater than the third threshold, random resource selection is used. UE may perform random resource selection based on the measurement and/or indication accordingly.

For above methods and solutions, different combinations may also be possible. For example, indication only may be used. Measurement only may be used. Measurement may be used in combination with indication. Measurement and indication may be used jointly. Different measurements, indications, parameters, criteria, rules, and/or conditions may be used in combination and may be used jointly with each other.

Some of functions for transmission and/or reception may be enabled or disabled. One solution may be to introduce reception and/or transmission functionality to random resource selection UE. Another solution may be to introduce additional NR signal(s) and/or channel(s) for reception and/or transmission to a random resource selection UE.

For example, PSFCH reception may not be enabled or may be disabled. For another example, S-SSB reception may not be enabled or may be disabled. Yet for another example, SL reception may not be enabled or may be disabled. Whether to include signal and/or channel and which signal and/or channel for reception may be configured and/or indicated to UE or reported to gNB. Whether to include signal and/or channel and which signal and/or channel for transmission may be configured or indicated to UE or reported to gNB. Whether to include reception and/or transmission may be configured and/or indicated to UE or reported to gNB.

A SCI-based (or DCI-based) indication may be used to indicate which signal and/or channel to use for reception and/or transmission. For example, S-SSB may be one of the signals/channels to use for reception and/or transmission. A SCI-based (or DCI-based) indication may be used to indicate which function or feature to use for reception and/or transmission. In groupcast, a SCI-based (or DCI-based) indication may be used to indicate for a group of UEs which signal and/or channel to use for reception and/or transmission. A SCI-based (or DCI-based) indication may be used to indicate for a group of UEs which function or feature to use for reception and/or transmission. In broadcast, a SCI-based (or DCI-based) indication may be used to indicate for all UEs which signal and/or channel to use for reception and/or transmission. A SCI-based (or DCI-based) indication may be used to indicate for all UEs which function or feature to use for reception and/or transmission.

A MAC CE-based activation may be used to activate/deactivate which signal and/or channel for reception and/or transmission. A MAC CE-based activation may be used to activate/deactivate which function or feature to use for reception and/or transmission. In groupcast, a MAC CE-based activation may be used to activate/deactivate a group of UEs for the signal and/or channel to use for reception and/or transmission. A MAC CE-based activation may be used to activate/deactivate a group of UEs which function or feature to use for reception and/or transmission. In broadcast, a MAC CE-based activation may be used to activate/deactivate all UEs for the signal and/or channel to use for reception and/or transmission. A MAC CE-based activation may be used to activate/deactivate all UEs which function or feature to use for reception and/or transmission.

An RRC-based configuration may be used to configure which signal and/or channel for reception and/or transmission. An RRC-based configuration may be used to configure which function or feature to use for reception and/or transmission. Alternatively, different UE types or UE capabilities may be defined. For example, one UE type or UE category, e.g., UE type A or UE category X may be defined or specified such as that some functions or features used for transmission and/or reception may be included or excluded. Another UE type or UE category, e.g., UE type B or UE category Y may be defined or specified such as that another functions or features to use for transmission and/or reception may be included or excluded.

For example, PSFCH reception and/or S-SSB reception may not be supported for Type A UE or category X UE. On the other hand, PSFCH reception and/or S-SSB reception may be included for Type B UE or category Y UE. SL reception may be included for Type C UE or category Z UE, and so on. Whether to include which signal and/or channel for reception and/or transmission may be configured and/or indicated to UE or report to gNB or another UE. It may also be broadcast to a group of UEs. UE type may be indicated to UE, or UE may report UE type to gNB, NW, another UE, or broadcast to a group of UEs. UE category may be indicated to UE, or UE may report UE category to gNB, NW, or another UE or broadcast to a group of UEs.

A SCI-based (or DCI-based) indication may be used to indicate which UE type for reception and/or transmission.

UE type may be broadcasted to UEs by broadcast. UE type may be groupcasted to a group of UEs by groupcast. UE type may be broadcasted in the $1^{st}$ stage SCI and/or the $2^{nd}$ stage SCI. UE type may be broadcasted using SCI format 1-A, or UE type may be groupcasted using SCI format 1-A, and/or SCI format 2-A, and/or SCI format 2-B. Alternatively, broadcast may be done via physical layer sidelink broadcast signal and/or channel, L2 or higher layer sidelink broadcast channel, or S-SSB, PSBCH, system information (SI), system information block (SIB), or the like.

An SCI-based (or DCI-based) indication may be used to indicate which UE category for reception and/or transmission.

UE category may be broadcasted to UE in broadcast. UE category may be groupcasted to a group of UEs by groupcast. UE category may be broadcasted in the $1^{st}$ stage SCI and/or the $2^{nd}$ stage SCI. UE category may be broadcasted in SCI format 1-A. UE category may be groupcasted in SCI format 1-A, and/or SCI format 2-A, and/or SCI format 2-B. Alternatively, broadcast may be done via physical layer sidelink broadcast signal and/or channel, L2 or higher layer sidelink broadcast channel, or S-SSB, PSBCH, system information (SI), system information block (SIB), or the like.

An MAC CE-based activation may be used to activate which UE type for reception and/or transmission. An MAC CE-based activation may be used to activate which UE category for reception and/or transmission.

An RRC-based configuration may be used to configure which UE category for reception and/or transmission. An RRC-based configuration may be used to configure which UE category for reception and/or transmission.

Figure 5:
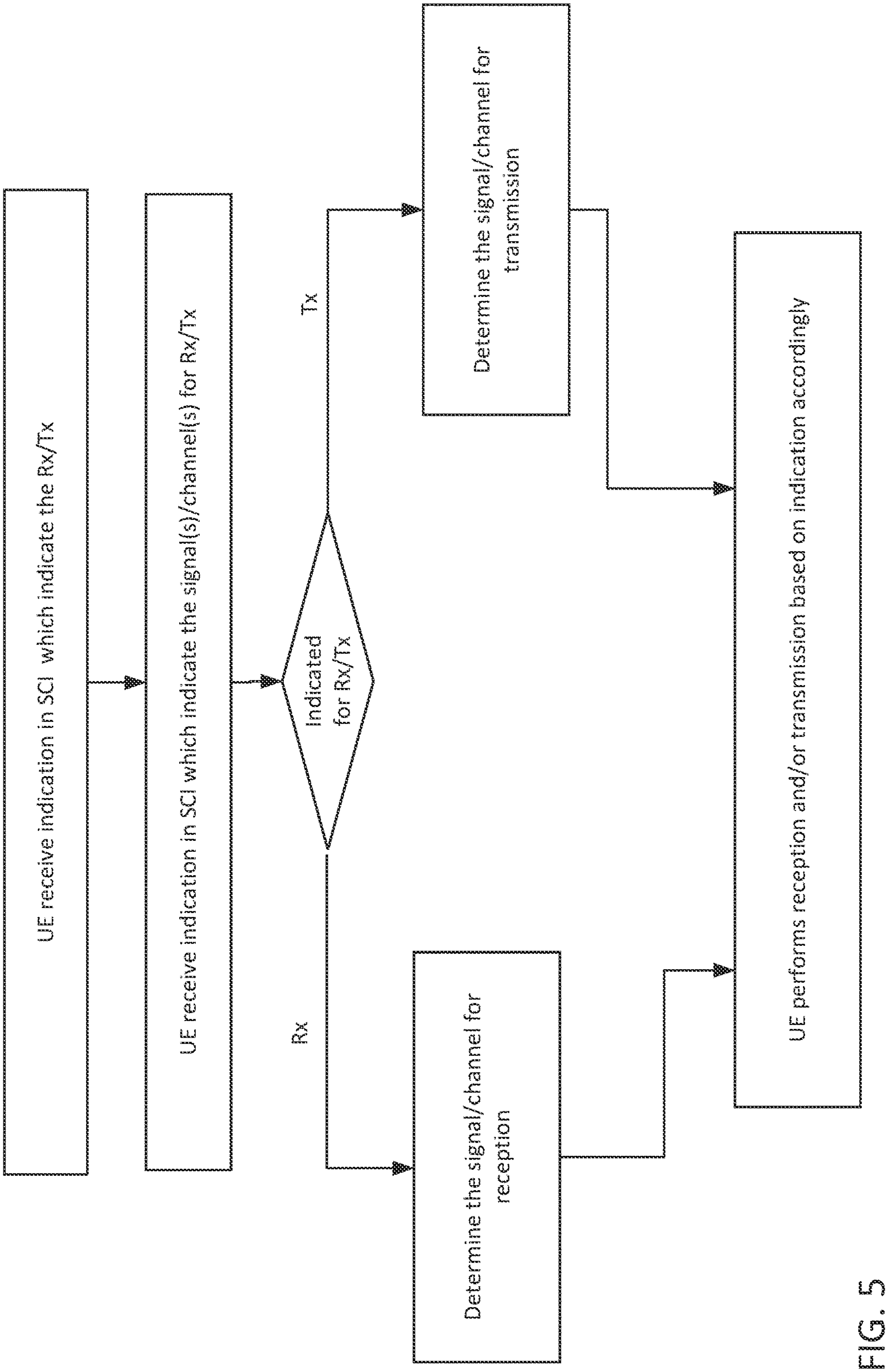
FIG. 5 is a flow chart of an example of random resource selection for Rx or Tx in NR Sidelink.

An example enhanced random resource selection for Rx or Tx in NR Sidelink is depicted in FIG. 5. UE may receive indication in SCI which indicates the transmission and/or reception. UE may also receive indication in SCI which indicates the signal and/or channel for transmission and/or reception. If the indicator indicates reception, then UE may determine the corresponding signal and/or channel for reception. If the indicator indicates transmission, then UE may determine the corresponding signal and/or channel for transmission. UE may perform reception and/or transmission for signal and/or channel accordingly based on received indication.

Figure 6:
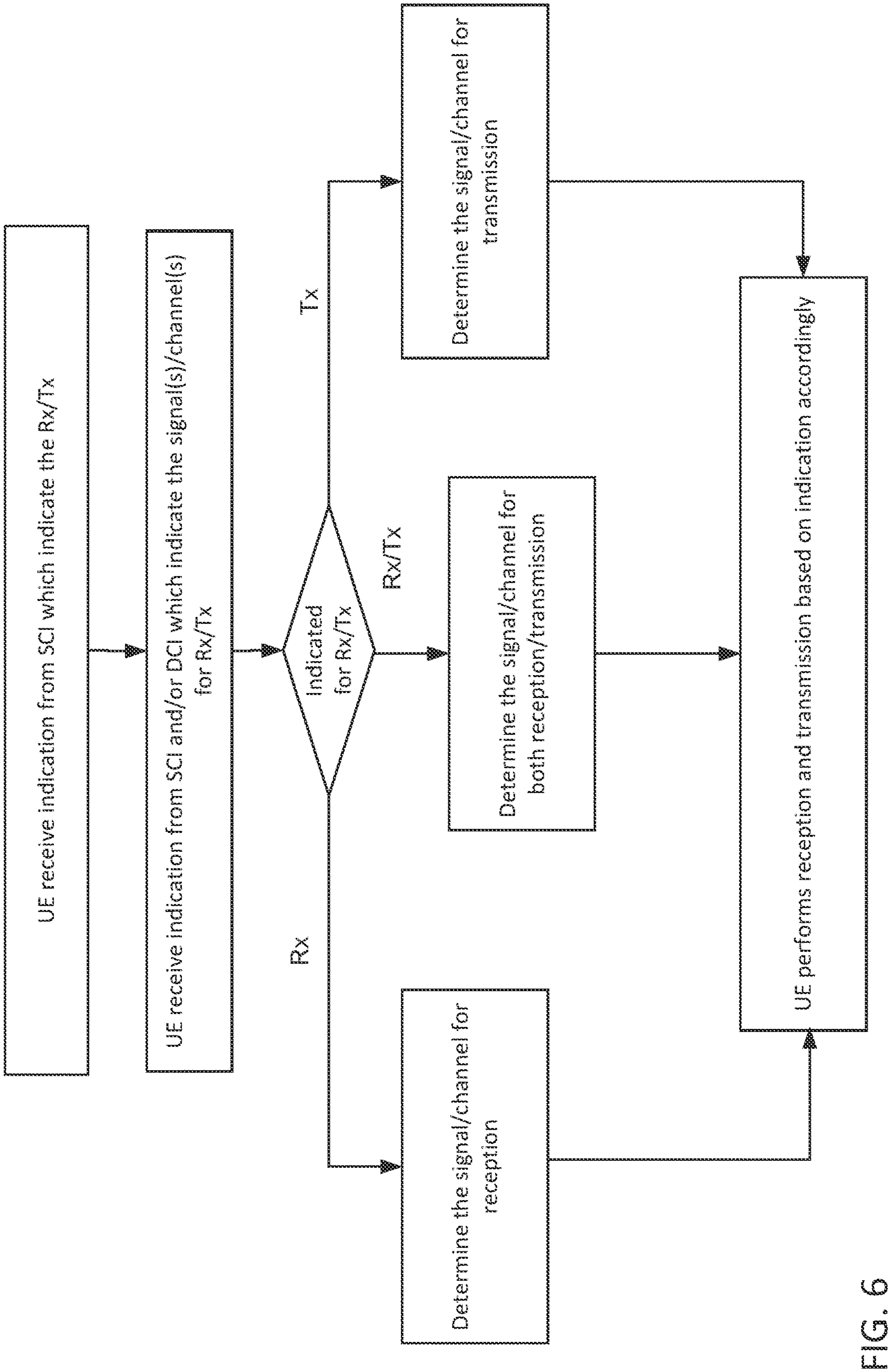
FIG. 6 is a flow chart of an example of random resource selection for Rx/Tx in NR Sidelink.

Another example enhanced random resource selection for Rx/Tx in NR Sidelink is depicted in FIG. 6. UE may receive indication in SCI which indicates the transmission and/or reception. UE may also receive indication in SCI which indicates the signal and/or channel for transmission and/or reception. If the indicator indicates reception, then UE may determine the corresponding signal and/or channel for reception. If the indicator indicates transmission, then UE may determine the corresponding signal and/or channel for transmission. If the indicator indicates both reception and transmission, then UE may determine the corresponding signal and/or channel for reception and transmission. UE may perform reception and transmission for signal and/or channel accordingly based on received indication.

Figure 7:
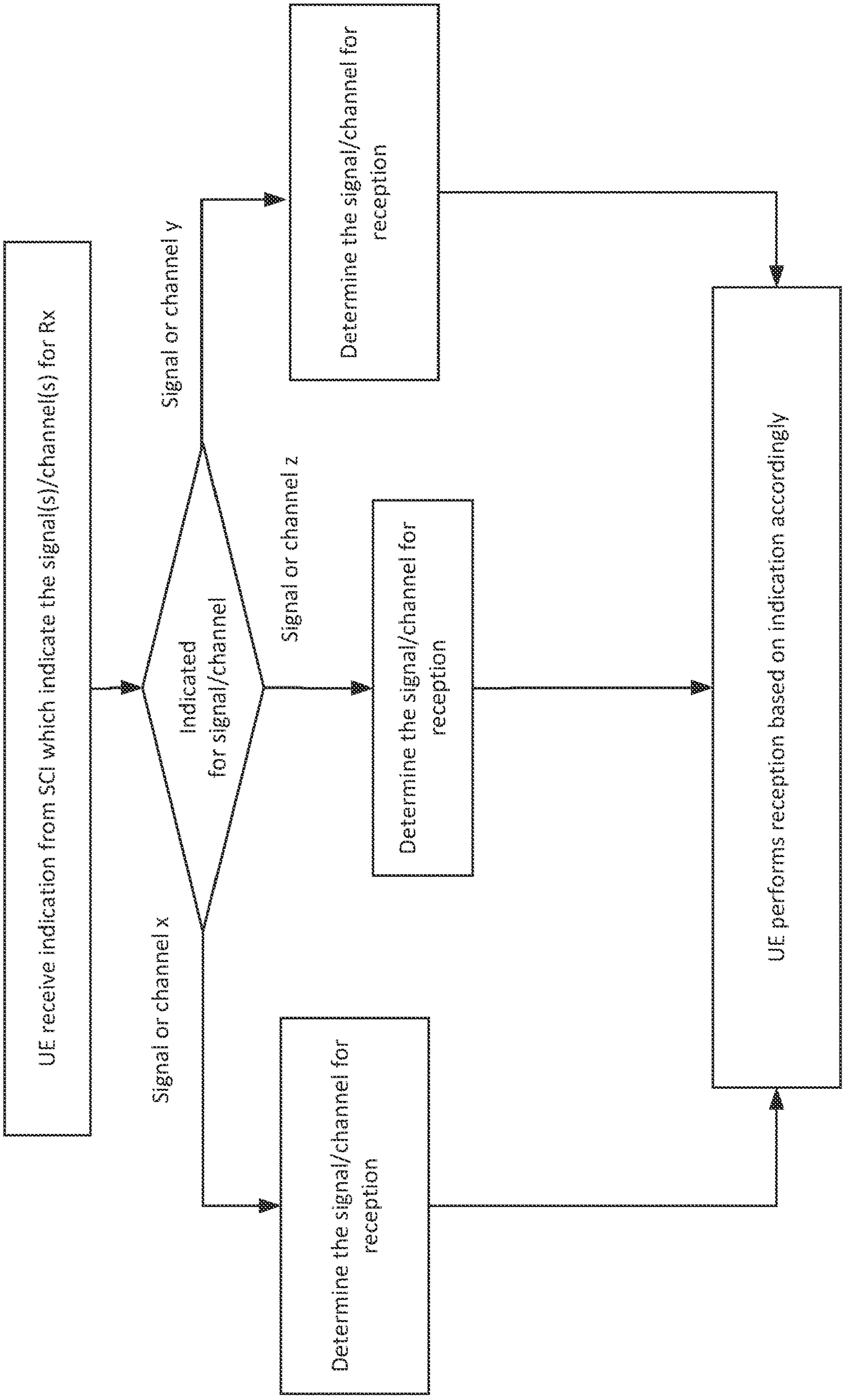
FIG. 7 is a flow chart of an example of random resource selection for RX in NR Sidelink.

Yet another example enhanced random resource selection for RX in NR Sidelink is depicted in FIG. 7. UE may receive indication in SCI which indicates the signal and/or channel for reception. If the indicator indicates signal/channel x, then UE may determine the corresponding signal and/or channel for reception. If the indicator indicates signal/channel y, then UE may determine the corresponding signal and/or channel for reception. If the indicator indicates signal/channel z, then UE may determine the corresponding signal and/or channel for reception. UE may perform reception for determined signal and/or channel accordingly based on received indication.

In general, signal x, y, z may be the Rx signal/channel to be added (e.g., to reference point). Signal x, y, z may be the Rx signal/channel to be removed (e.g., from reference point). Reference point may be defined as baseline. Reference point may be based on random resource selection if signal x, y, z is the Rx signal/channel to be added to reference. Reference point may be based on full feature or function or based on full sensing if signal x, y, z is the Rx signal/channel to be removed from reference point. Combination of signal/channel x, y, z may be used. Signals and/or channels more than signal/channel x, y, z may be used e.g., signal/channel u, v, w, . . . etc. may be included for addition and/or removing. Combinations of signal/channels x, y, z, u, v, w, . . . may also be used.

Figure 8:
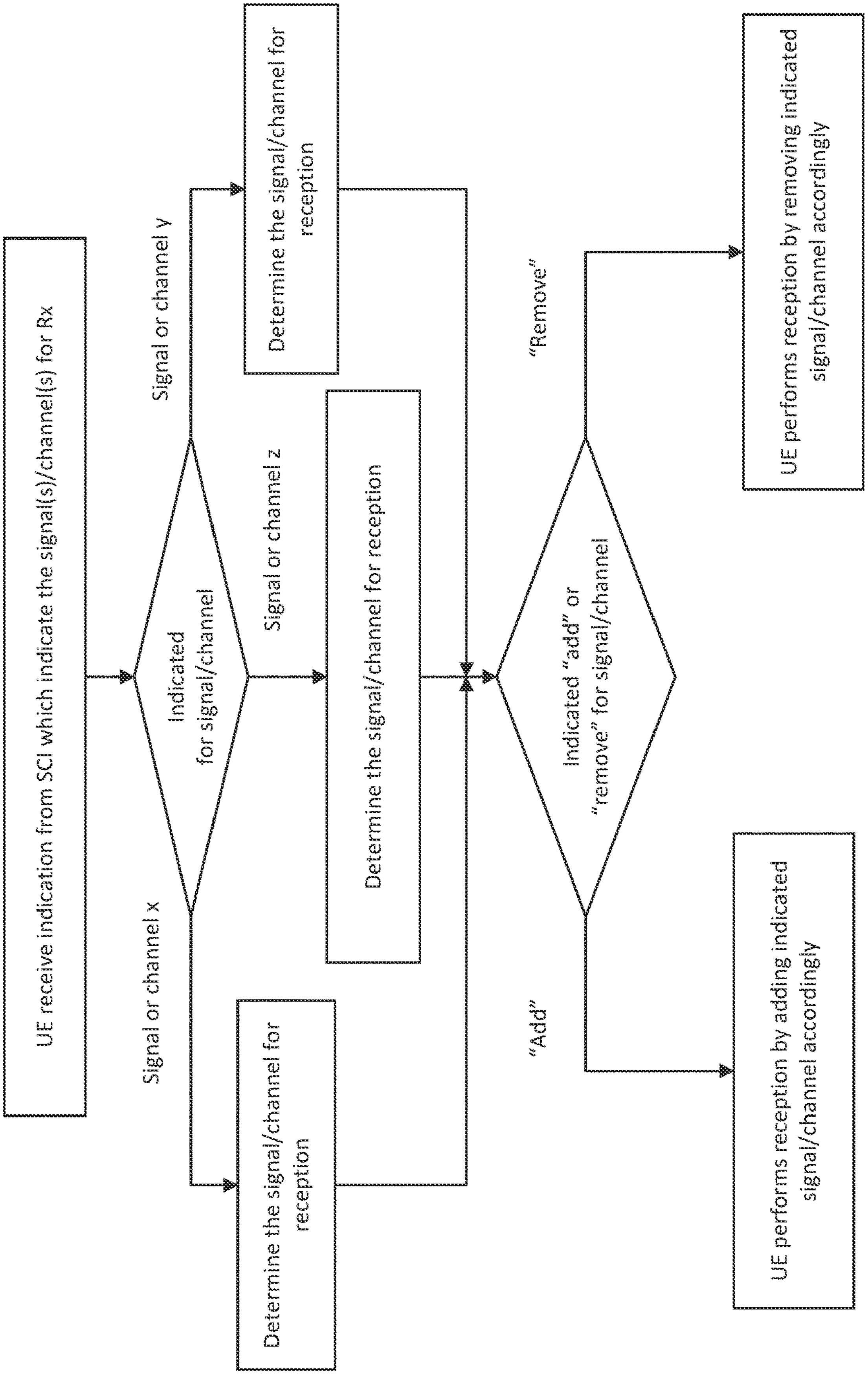
FIG. 8 is a flow chart of an example of scheme for RX with "add" and "remove" in NR Sidelink.

An example enhanced scheme for RX with "add" and "remove" in NR Sidelink is depicted in FIG. 8.

UE may receive indication in SCI which indicates the signal and/or channel for reception. If the indicator indicates signal/channel x, then UE may determine the corresponding signal and/or channel for reception. If the indicator indicates signal/channel y, then UE may determine the corresponding signal and/or channel for reception. If the indicator indicates signal/channel z, then UE may determine the corresponding signal and/or channel for reception. Furthermore, if the indicator indicates "add," then UE may perform reception on the signal/channel which is added. If the indicator indicates "remove," then UE may not perform reception on the signal/channel which is removed.

UE may or may not perform reception for determined signal and/or channel accordingly based on received indication for "add" or "remove."

The principles may be applicable to transmission, reception, and both transmission and reception as well. Indicator may be in physical layer or higher layer. For example, indicator may be in sidelink control information (SCI), MAC CE, and/or RRC.

An example of indicator for reception/transmission is depicted in Table 2 of the Appendix.

Another example of indicator for adding or removing signal/channel from reception is depicted in Table 3 of the Appendix.

Another solution may be that resource selection may be designed to be non-uniformly random, e.g., weighted random instead of uniformly random. Some resource may be selected with lower probability for non-random resource selection UEs. For example, gNB may configure the resources in such way that some resources may be associated with higher probability for random resource selection based UEs (UEs who perform random resource selection), while other resources may be associated with lower probability for non-random resource selection based UEs (UEs who do not perform random resource selection). A parameter "probability" or "probability for resource selection" may be used. To one extreme, some resource may be exclusively reserved for random resource selection UE (probability for non-random resource selection UEs is zero). The cost may be less resource usage efficiency. To the other extreme, some resource may be exclusively reserved for non-random resource selection UE (probability for non-random resource selection UEs is one). Non-random resource selection may be partial sensing or full sensing. By configuring different weights of resource selection for resource, trade-off between collision and resource utilization efficiency could be enhanced, and performance could be enhanced and optimized.

Figure 9:
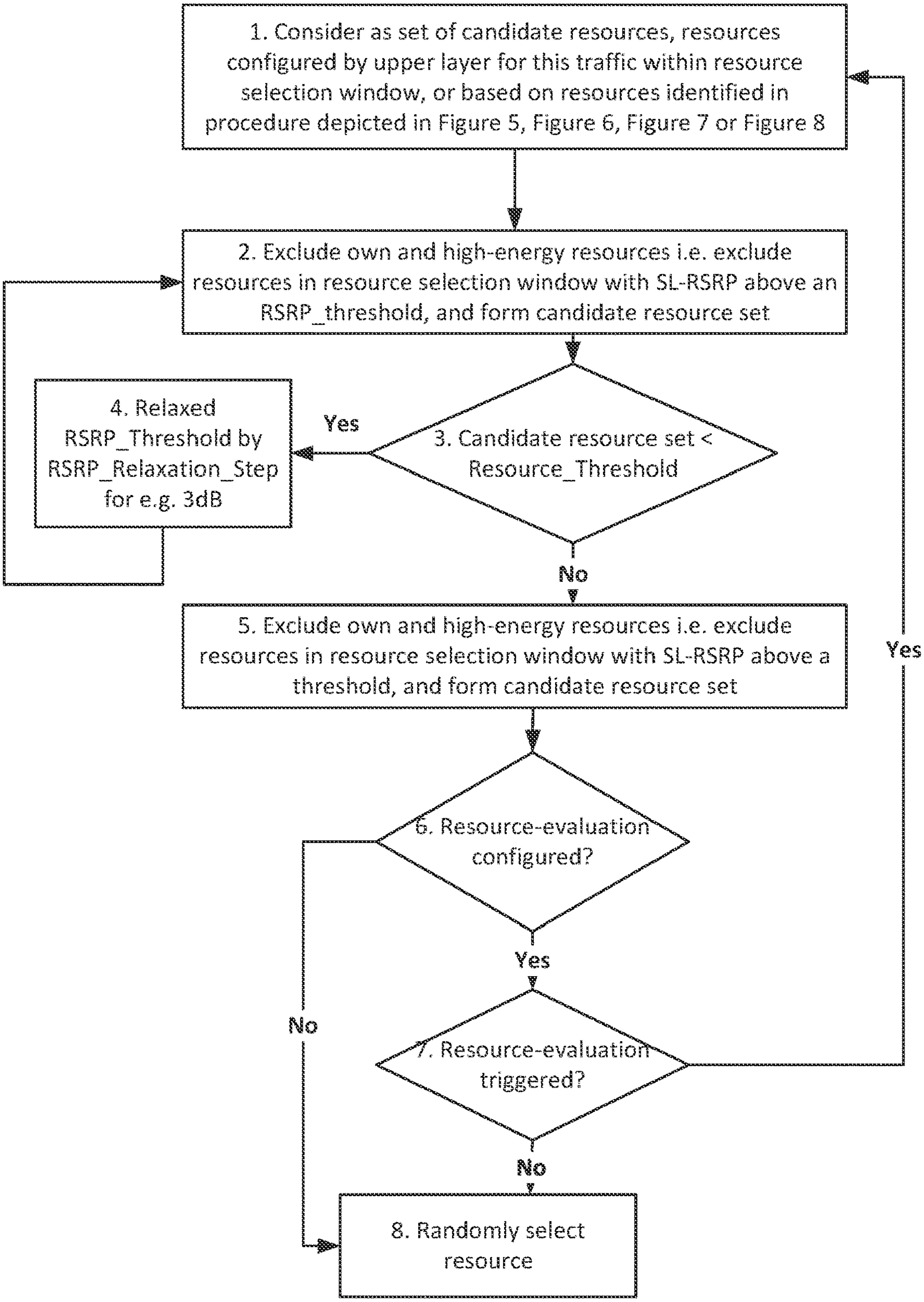
FIG. 9 is a flow chart of an example of random resource selection with no prior sensing and without congestion control.
Figure 10A:
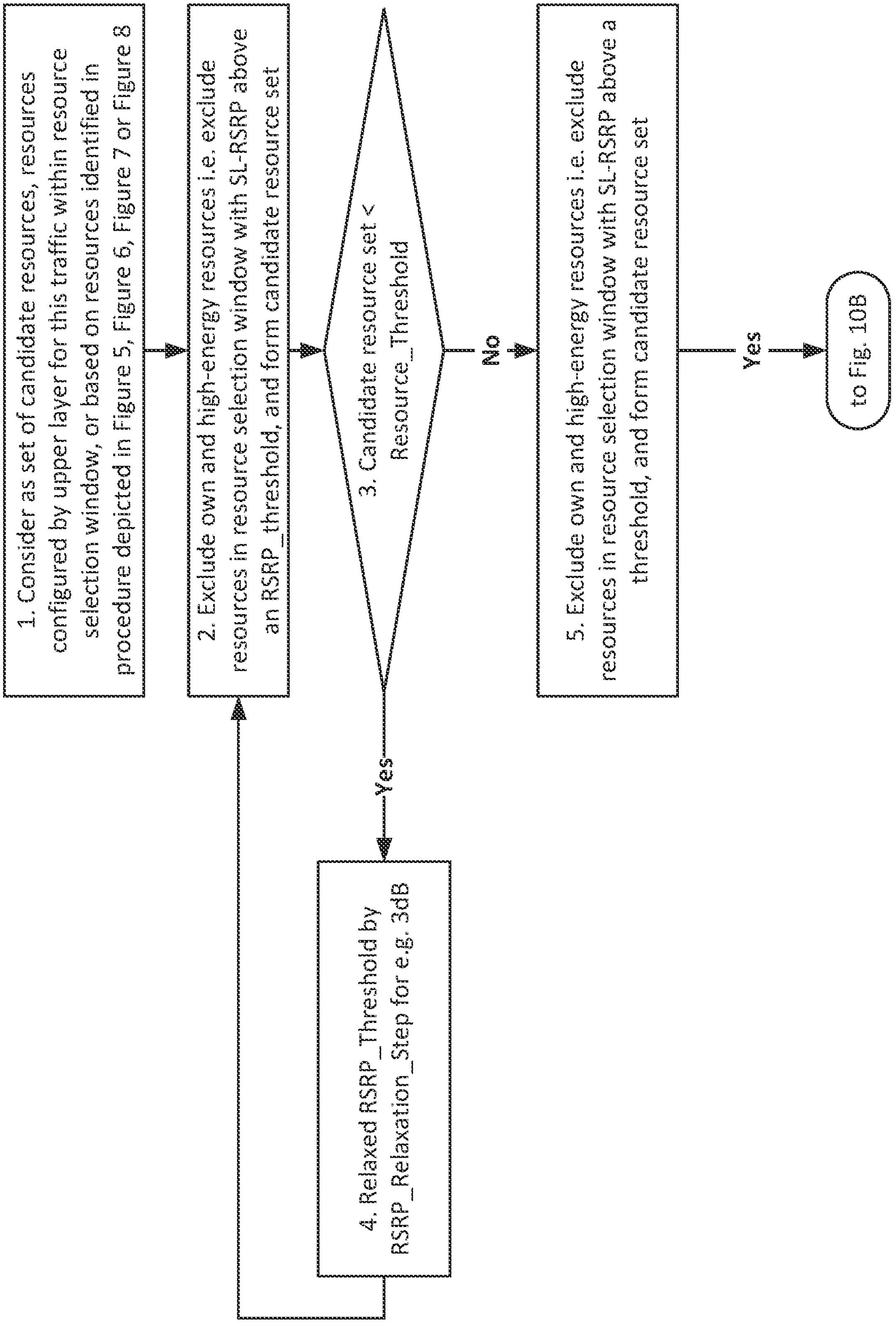
FIGS. 10A and 10B show a flow chart of an example of random resource selection with no prior sensing but with congestion control.
Figure 10B:
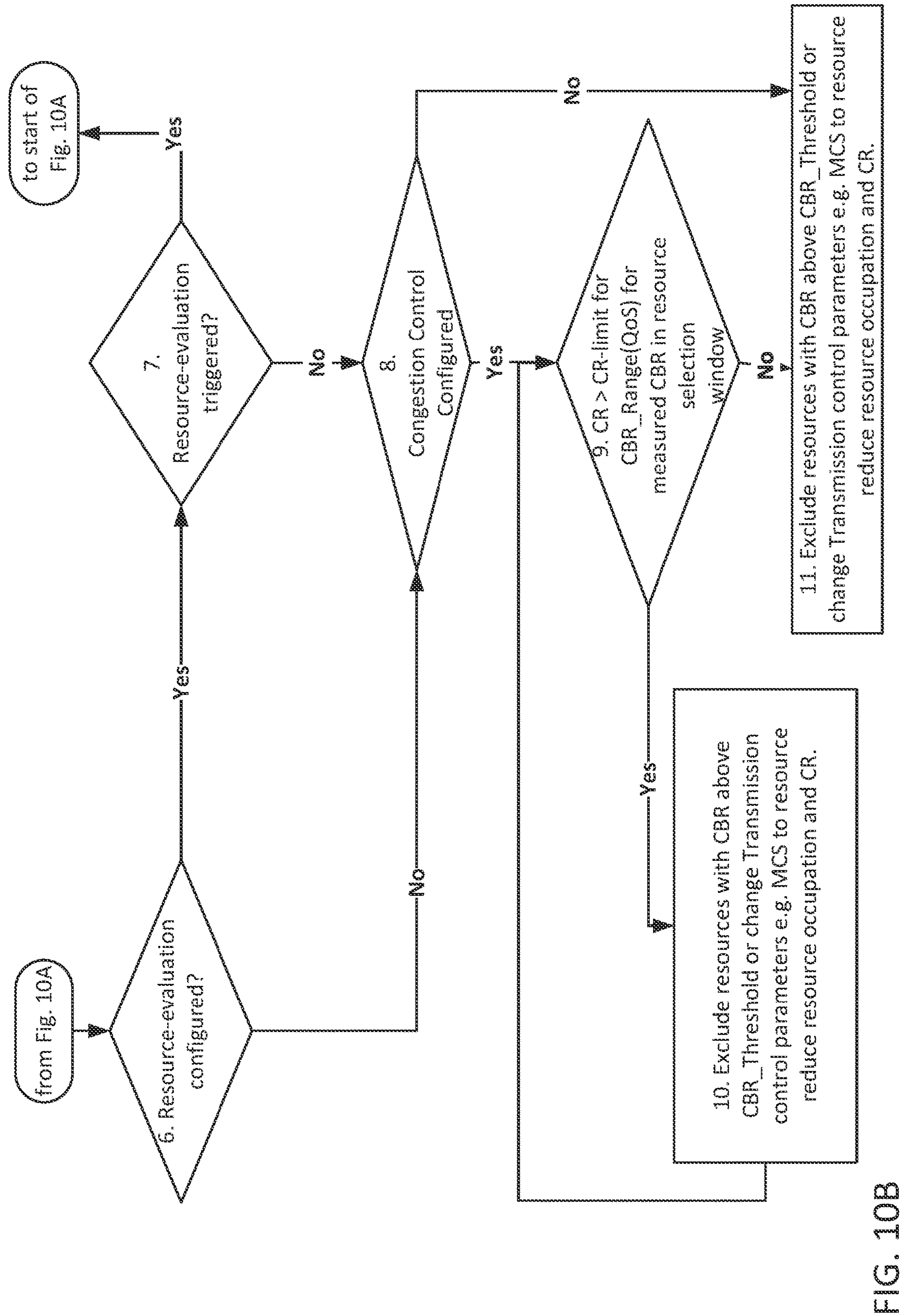

Additional Embodiments for Random Resource Selection with or without congestion control are illustrated herein in FIG. 9, FIG. 10A, and FIG. 10B.

Enhanced Partial Sensing

A resource pool may be configured or preconfigured with partial sensing. UE may perform partial sensing or periodic-based partial sensing. SCI may indicate the reservation for another TB for the resource pool.

One solution may be to indicate to UE which sensing type should be used. The sensing type may be random resource selection, partial sensing, or full sensing, for example.

Another solution may be to indicate to UE the exact sensing scheme to use. The exact partial sensing scheme may be contiguous partial sensing or periodic-based partial sensing, for example The contiguous partial sensing and/or periodic-based partial sensing may be used in combination with random resource selection only without sensing or re-evaluation and pre-emption checking. The contiguous partial sensing and/or periodic-based partial sensing may also be used with or without re-evaluation and pre-emption checking.

Figure 11:
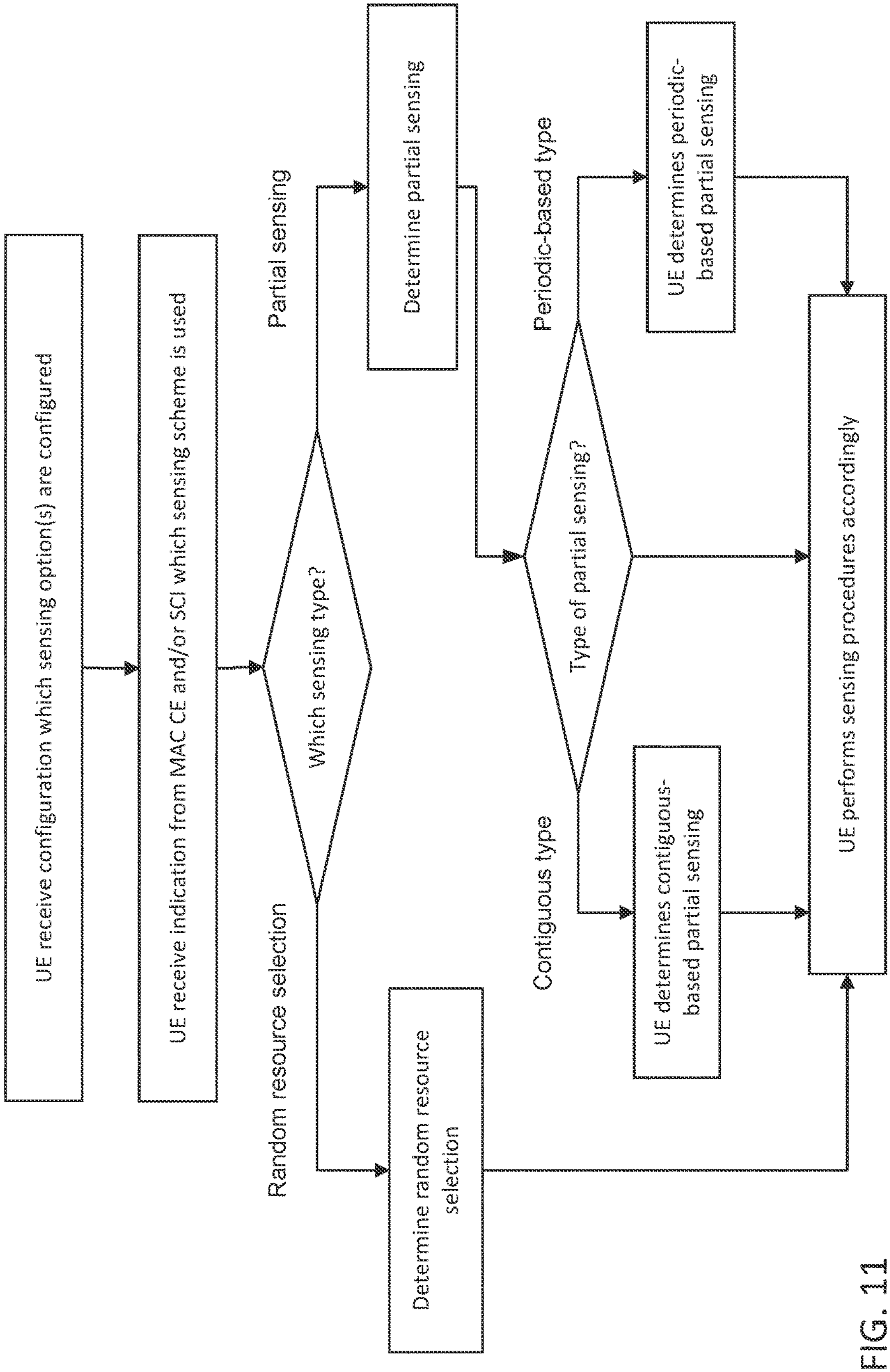
FIG. 11 is a flow chart of an example of partial sensing in NR sidelink.

An example of enhanced partial sensing in NR Sidelink is depicted in FIG. 11. UE may receive configuration for sensing options to be performed. UE may further receive the indication from MAC CE or SCI for sensing scheme to be used. If indicated sensing type is partial sensing, then UE may determine to use partial sensing for its sensing measurement.

Furthermore, UE may further determine the type of partial sensing (contiguous partial sensing or periodic-based partial sensing). If contiguous partial sensing is indicated, then UE may determine to use contiguous partial sensing. Otherwise, if periodic-based partial sensing is indicated, then UE may determine to use periodic-based partial sensing. On the other hand, if the indicated sensing type is random resource selection, then UE may determine to use random resource selection. Once the sensing type and sensing scheme is determined and selected, UE may perform sensing procedures based on the corresponding sensing type and sensing scheme.

Figure 12:
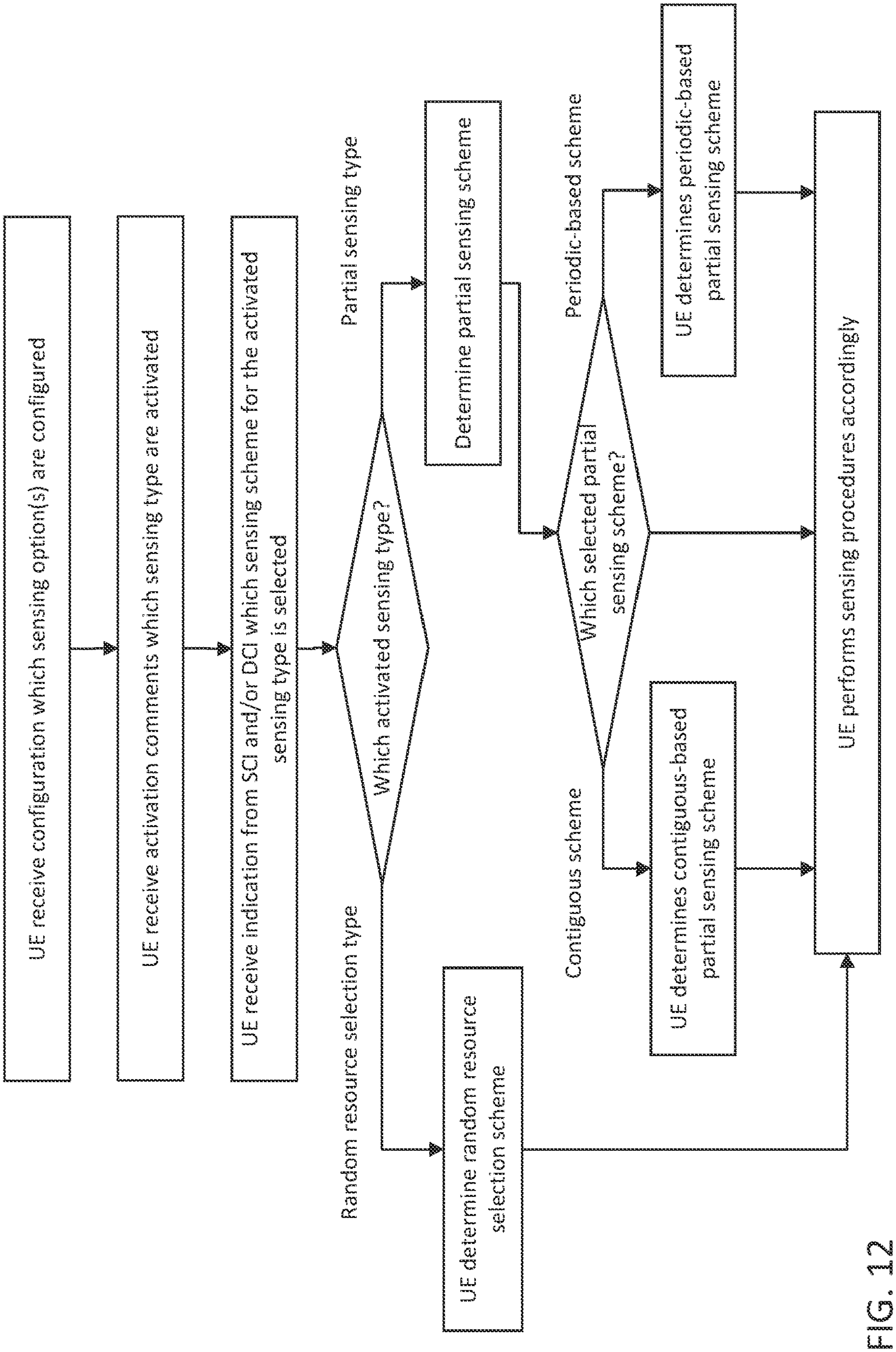
FIG. 12 is a flow chart of an example of partial sensing in NR sidelink.

Another example of enhanced partial sensing in NR Sidelink is depicted in FIG. 12. UE may receive configuration for sensing options to be performed. UE may receive the activation from MAC CE for sensing type to be used. UE may further receive the indication from SCI for sensing scheme to be used.

For example, if two sensing options are configured, e.g., partial sensing and random resource selection, then UE may determine which sensing option or sensing type is activated based on MAC CE. If activated sensing type is partial sensing, then UE may determine to use partial sensing for its sensing measurement. UE may further determine the partial sensing scheme (contiguous partial sensing or periodic-based partial sensing) based on SCI. If contiguous partial sensing is indicated in SCI, then UE may determine to use contiguous partial sensing. Otherwise, if periodic-based partial sensing is indicated in SCI, then UE may determine to use periodic-based partial sensing.

On the other hand, if the random resource selection is activated, then UE may determine to use random resource selection. Once the sensing type and sensing scheme is determined and selected, UE may perform sensing procedures based on the corresponding sensing type and sensing scheme.

Sensing types or sensing options may be but not limited to partial sensing, full sensing, or random resource selection. Partial sensing scheme may be but not limited to contiguous partial sensing or periodic-based partial sensing.

UE may determine the sensing type and sensing scheme based on configuration in RRC, activation in MAC CE, and indication in SCI. gNB or Network may determine the sensing type and sensing scheme based on measurement, criteria, rule(s), or the like. UE may provide the assistance information to gNB or Network to assist decision of sensing type and sensing scheme made by gNB or Network. UE may also determine the sensing type and sensing scheme autonomously based on measurement, criteria, rule(s), or the like. UE may perform full autonomous selection of sensing type and sensing scheme with guidance from gNB or Network. Any combinations of above may also be possible.

Conditions such as CBR, QoS, ACK and/or NACK, SL-RSRP, SL-RSSI, traffic type, service type, priority, data rate, SNR, SINR, CR, etc. may be used to trigger sensing procedures such as partial sensing or other sensing type or sensing scheme. Detection of number of NACKs on PSFCH may also be used to trigger sensing procedures such as partial sensing or other sensing type or sensing scheme.

Another solution may be to introduce sensing components to resource selection for UE. The following may be considered for sensing components: PSCCH decoding; PSCCH-DMRS measurements; PSSCH-DMRS measurements; or any combination thereof.

Above may be enabled or disabled while other reception functions may be disabled. For example, if PSCCH is enabled, then preemption (or preemption indication, or priority indication) in SCI may be used. If PSCCH-DMRS is enabled, then interference measurement may be used. If PSSCH-DMRS is enabled, then more accurate interference measurement may be possible.

In addition, SCI-based only, measurement-only based, or both, etc. may also be considered for sensing, including contiguous-only partial sensing, periodic-only partial sensing, random resource selection, or the like. One or more of above may be used for sensing. Trade-off between collision probability, decoding, measurement accuracy, and power may be enabled and achieved.

Sensing components may be introduced to random resource selection for UE. The sensing components may include, for example, PSCCH decoding only, PSCCH-DMRS, and/or PSSCH-DMRS measurements only. Introducing a level of sensing for random resource selection may be considered. In order not to increase power consumption too much for random resource selection due to sensing, limited sensing or restricted sensing may be considered. "Limited sensing" or "restricted sensing" may refer to sensing in which limitation or restriction in time and frequency domain for sensing may be introduced. In addition, a limitation or restriction in functionality or feature for sensing may also be introduced. For example, limited sensing or restricted sensing may be based exclusively on SCI in which resource reservation from other UEs could be obtainable. Alternatively, limited sensing or restricted sensing may be based exclusively on a measurement in which interference from other UEs could be detectable. By introducing limited sensing or restricted sensing to random resource selection, or imposing restriction on sensing for random resource selection, power consumption reduction may be achievable. Pre-emption and re-evaluation may be used for random resource selection or partial sensing. Pre-emption and re-evaluation based on SCI-only, based on PSCCH-DMRS only, based on PSSCH-DMRS only, or based on measurement only may also be used for random resource selection or partial sensing. Alternatively, pre-emption and re-evaluation with limited sensing or restricted sensing may be used for random resource selection or partial sensing.

Resource selection or reselection may be triggered at a certain time slot. UE may determine a set of candidate slots within a resource selection window. The conditions and timings for UE to perform periodic-based partial sensing may be considered. This may depend on CBR, QoS, priority, SL L1-RSRP, SL L1_RSSI, traffic type, service type, measurement, data rate, SNR, SINR, CR, etc. Timing may be before resource selection window, after resource selection window, or within resource selection window. Timing may be before sensing window, after sensing window, or within sensing window. Timing may be between sensing window and resource selection window, or after resource selection window and between resource selection window and actual transmission. The resource selection window may be [n+T1, n+T2]. A threshold for T1 and T2 may be used. The window size may be less than a configured or a preconfigured threshold.

A minimum value for the number of candidate slots is configured or preconfigured from a range of values. UE may monitor slots of one periodic sensing occasion or a set of periodic sensing occasions. A periodic sensing occasion may be a set of slots based on parameters $P_{reserve}$, y and k.

$$t^{SL}_{y-k\times P_{reserve}}$$

where $t_y^{SL}$ may be in the set of candidate slots for resource selection.

The parameter $P_{reserve}$ may be a value of periodicity from the configured set of possible resource reservation periods which are allowed in the resource pool. The value of $P_{reserve}$ may be all values from the configured set or may be only a subset of values from the configured set. The subset may be determined by configuration in RRC, pre-configuration, activation by MAC CE or indication by SCI. The subset may also be based on UE's autonomous selection and determination. A common value in the configured set may be used for $P_{reserve}$.

The parameter k may be selected according to some measurement, measurements, rule, or rules. One possibility may be to use only the most recent sensing occasion for a given reservation periodicity before the resource (re)selection trigger. Another possibility may be to use only the most recent sensing occasion for a given reservation periodicity before the set of candidate slots. Yet another possibility may be to use the M most recent sensing occasions for a given reservation periodicity before the resource selection or reselection trigger or the set of candidate slots. This may be within the sensing window, outside the sensing window, or having the overlapping with sensing window. M may be equal or greater than two. Yet another possibility may be to use all sensing occasions. All sensing occasions may be after certain times. For example, all sensing occasions may be after starting time of sensing window.

Yet another possibility may be to use one or multiple (e.g., M2) periodic sensing occasion for one reservation period. The periodic sensing occasion may not be the most recent occasion and could be determined by UE based on determined value of the parameter k or based on configured values or preconfigured values. Maximal value for k may be configured or preconfigured. Exact values of k may also be configured or preconfigured. A single value of k or multiple values of k may be used. A bitmap for k may also be used. Such bitmap for k may be configured, pre-configured or activated or dynamically indicated. Either single k, multiple k or bitmap of k may be indicated via SCI-based (or DCI-based) indication, MAC CE-based indication or RRC-based configuration, or a combination of them. A set of values for k may be configured by RRC. A subset of values for k may be activated by MAC CE. An exact value for k may be indicated by SCI in PSCCH or PSSCH. Value of M2 may be equal to one or greater than one.

Conditions and timings for which periodic-based partial sensing performed by UE may depend on CBR, QoS, priority, measurements, traffic type, service type, data rate, CR, or the like. UE may perform contiguous partial sensing. Resource (re-)selection may be triggered in a certain time slot e.g., time slot n. UE may monitor time slots for resource selection or reselection. UE may monitor time slots in certain monitoring window. For example, UE may monitor time slots in the monitoring window and may perform selection of candidate resources based on all available sensing results. The sensing results may include contiguous partial sensing, aperiodic-based partial sensing and/or periodic-based partial sensing results or the like. UE may perform selection of candidate resources in or after slot of beginning of monitoring window.

$T_x$, $T_y$ may be configured, preconfigured, or dynamically activated or indicated for monitoring window [n+$T_x$, n+$T_y$]. The time instants $T_x$, $T_y$ may be values that are preconfigured, configured or indicated. UE may monitor time slots for resource selection or reselection and certain time slots may be excluded from resources. Exclusion of time slots may be configured, pre-configured, or dynamically activated or indicated. In addition, the size of window, the location of window, the ratio or difference of $T_x$ over $T_y$ values may be configured, pre-configured or dynamically activated or indicated.

Resource (re-)selection may be triggered in a certain time slot e.g., time slot n. This may be used for reference point. Some other reference point may also be used. For example, index of some of candidate slots may also be used as reference point.

Conditions for contiguous partial sensing performed by UE may be based on CBR, QoS, priority, measurements, indication, traffic type, service type, data rate, SNR, SINR, CR, or the like.

Interaction between contiguous partial sensing and periodic-based partial sensing may need to be considered. Contiguous partial sensing may be enabled or disabled. Periodic-based partial sensing may be enabled or disabled. The need for contiguous partial sensing and/or periodic-based partial sensing may be configured, activated, or indicated. In some condition(s) or scenario(s), only contiguous partial sensing may be configured, activated, or enabled. In other condition (s) or scenario(s), only periodic-based partial sensing may be configured, activated, or enabled. In another condition(s) or scenario(s), both contiguous and periodic-based partial sensing may be configured, activated, or enabled. Enabling of contiguous partial sensing and/or periodic-based partial sensing may be based on SCI. Enabling of contiguous partial sensing and/or periodic-based partial sensing may be based on the $1^{st}$ stage SCI or the $2^{nd}$ stage SCI. Enabling of contiguous partial sensing and/or periodic-based partial sensing may be based on the SCI format 1-A, the SCI format 2-A, or SCI format 2-B. Enabling of contiguous partial sensing and/or periodic-based partial sensing may be based on the new SCI format 1-B or SCI format 1-X, or the new SCI format 2-C or SCI format 2-Y. Enabling of contiguous partial sensing and/or periodic-based partial sensing may be based on MAC CE or RRC. Enabling of contiguous partial sensing and/or periodic-based partial sensing may be based on combination of SCI, (or DCI), MAC CE, and/or RRC. Whether to use periodic-based partial sensing or contiguous partial sensing may also be pre-configured.

Depending on application, scenario, and mode, RRC may be sidelink RRC e.g., PC5 RRC, Un interface RRC or the like. MAC CE may be sidelink MAC CE (SL-MAC CE), Un interface MAC CE or the like. Physical layer control may be sidelink control information (SCI), downlink control information (DCI) or the like.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive e-call, disaster alerts, real-time gaming, multi-person video calls, autonomous driving, augmented reality, tactile internet, virtual reality, home automation, robotics, and aerial drones to name a few. All of these use cases and others are contemplated herein.

Figure 13A:
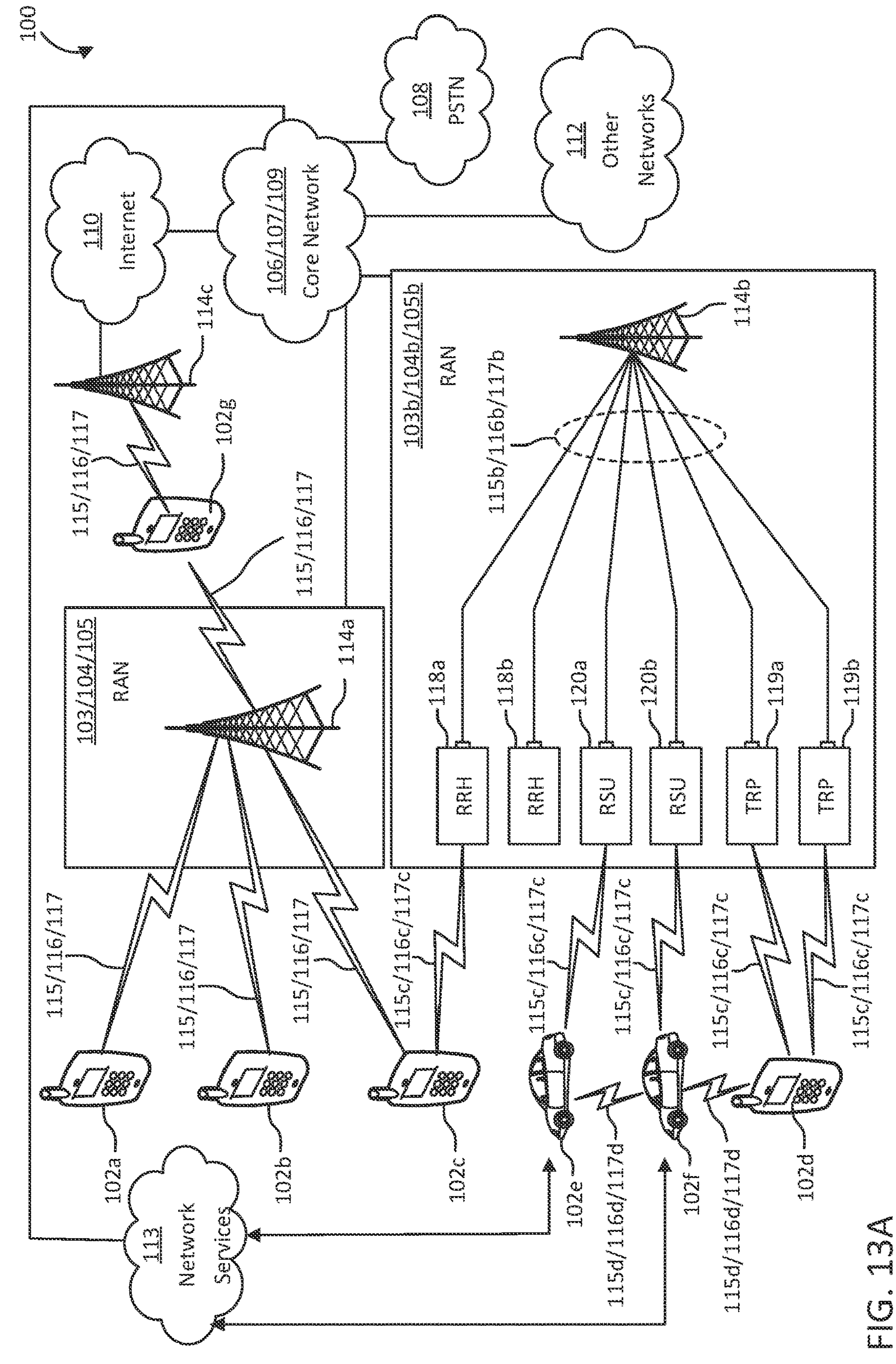
FIG. 13A illustrates an example communications system.

FIG. 13A illustrates an example communications system 100 in which the systems, methods, and apparatuses described and claimed herein may be used. The communications system 100 may include wireless transmit/receive units (WTRUs) 102*a*, 102*b*, 102*c*, 102*d*, 102*e*, 102*f*, and/or 102*g*, which generally or collectively may be referred to as WTRU 102 or WTRUs 102. The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 13A, each of the WTRUs 102 is depicted in FIGS. 13A-E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114*a* and a base station 114*b*. In the example of FIG. 13A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114*b* may be any type of device configured to wired and/or wirelessly interface with at least one of the Remote Radio Heads (RRHs) 118*a*, 118*b*, Transmission and Reception Points (TRPs) 119*a*, 119*b*, and/or Roadside Units (RSUs) 120*a* and 120*b* to facilitate access to one or more communication networks, such as the core network 106/107/109, the Internet 110, other networks 112, and/or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, and/or other networks 112.

TRPs 119*a*, 119*b* may be any type of device configured to wirelessly interface with at least one of the WTRU 102*d*, to facilitate access to one or more communication networks, such as the core network 106/107/109, the Internet 110, Network Services 113, and/or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, and/or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations and/or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 119*a* and 119*b*, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*,TRPs 119*a*, 119*b* and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 13A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114*c* and the WTRUs 102, e.g., WRTU 102*e*, may utilize a cellular-based RAT (e.g., WCDMA, CDMA2000, GSM, LTE, LTE-A, NR, etc.) to establish a picocell or femtocell. As shown in FIG. 13A, the base station 114*c* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 13A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links. For example, the WTRU 102*g* shown in FIG. 13A may be configured to communicate with the base station 114*a*, which may employ a cellular-based radio technology, and with the base station 114*c*, which may employ an IEEE 802 radio technology.

Although not shown in FIG. 13A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117, and 115*c*/116*c*/117*c* may equally apply to a wired connection.

Figure 13B:
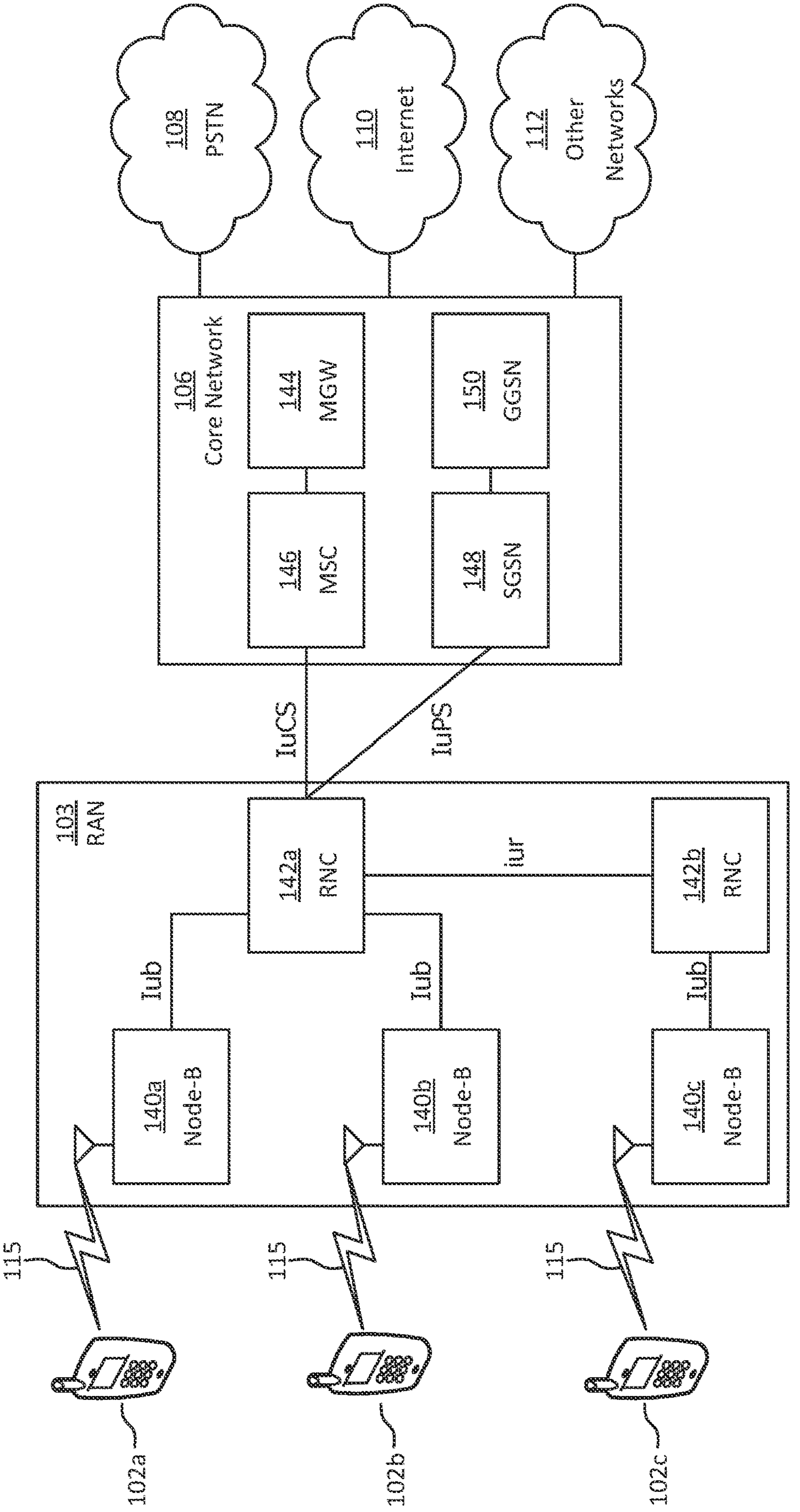
FIGS. 13B-D are system diagrams of example RANs and core networks.

FIG. 13B is a system diagram of an example RAN 103 and core network 106. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 13B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It will be appreciated that the RAN 103 may include any number of Node-Bs and Radio Network Controllers (RNCs.)

As shown in FIG. 13B, the Node-Bs 140*a*, 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 13B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned and/or operated by other service providers.

Figure 13C:
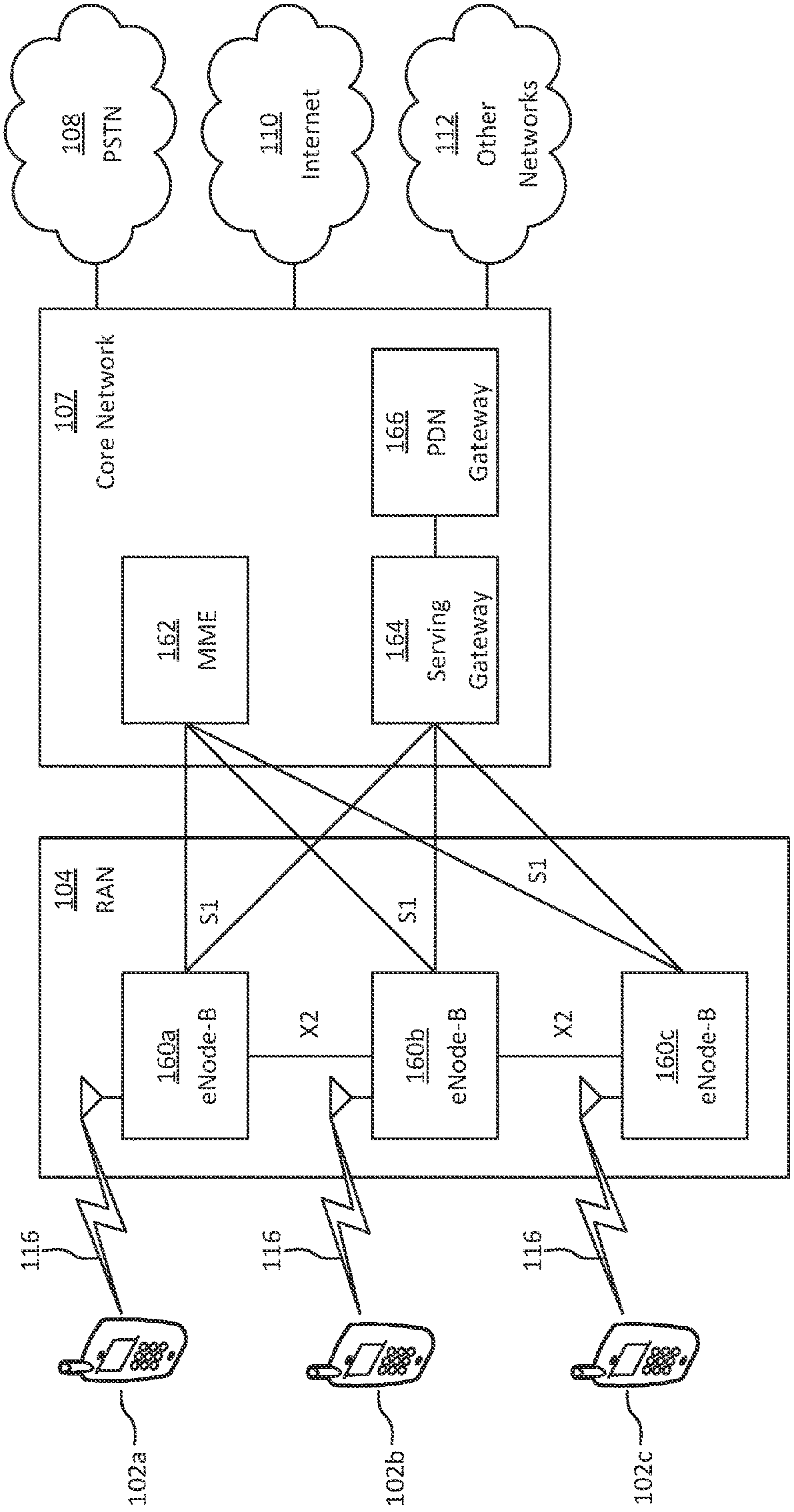

FIG. 13C is a system diagram of an example RAN 104 and core network 107. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it will be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 13C, the eNode-Bs 160*a*, 160*b*, and 160*c* may communicate with one another over an X2 interface.

The core network 107 shown in FIG. 13C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned and/or operated by other service providers.

Figure 13D:
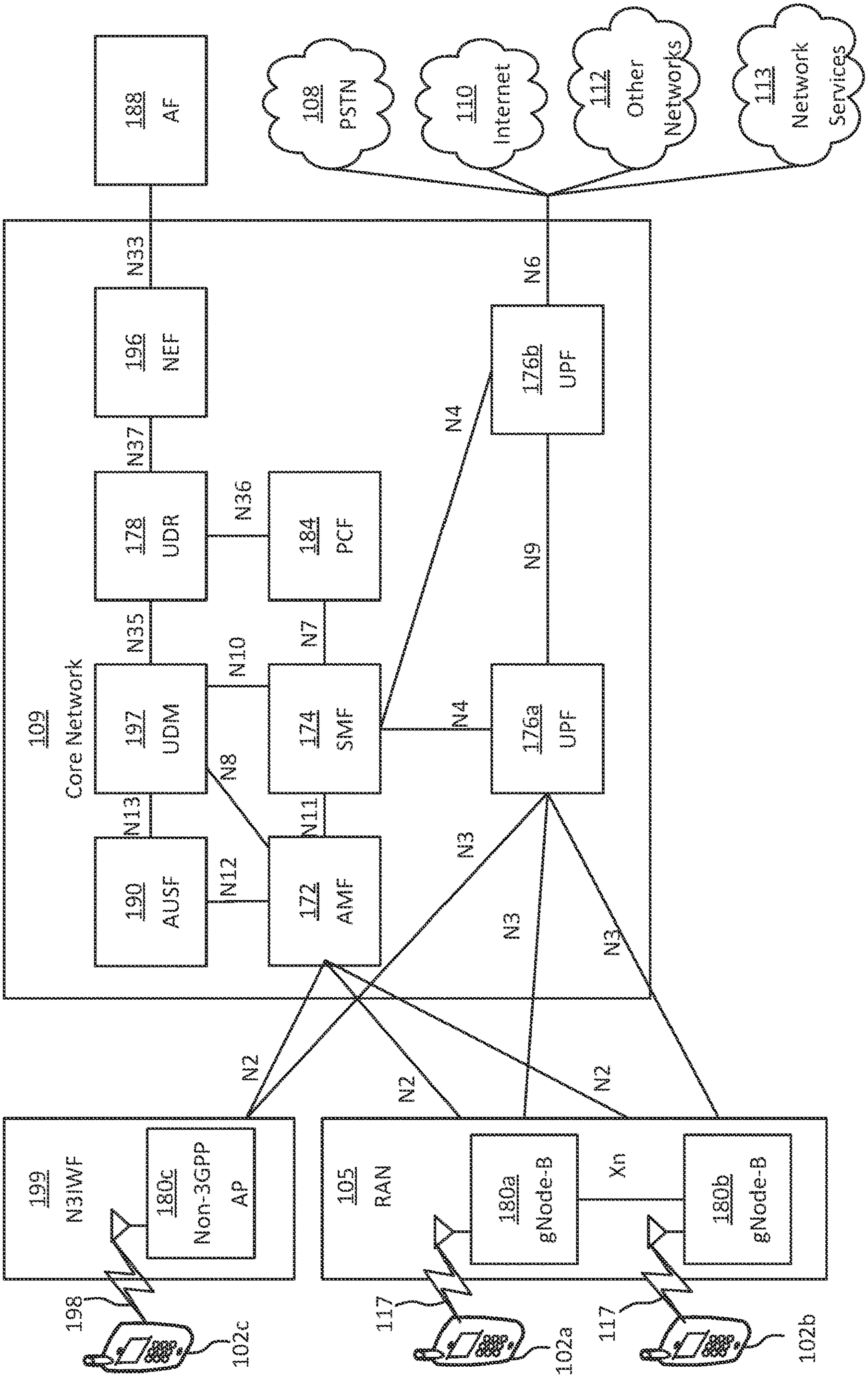

FIG. 13D is a system diagram of an example RAN 105 and core network 109. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU 102*c* over the air interface 198. The N3IWF 199 may also be in communication with the core network 109.

The RAN 105 may include gNode-Bs 180*a* and 180*b*. It will be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, and/or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180*c*. It will be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink and/or downlink, and the like. As shown in FIG. 13D, the gNode-Bs 180*a* and 180*b* may communicate with one another over an Xn interface, for example.

The core network 109 shown in FIG. 13D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 13G.

In the example of FIG. 13D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, instead, may consist of additional elements, and may consist of multiple instances of each of these elements. FIG. 13D shows that network functions directly connect to one another; however, it should be appreciated that they may communicate via routing agents such as a diameter routing agent or message buses.

In the example of FIG. 13D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*, 102*b*, and 102*c* via an N1 interface. The N1 interface is not shown in FIG. 13D.

The SMF 174 may be connected to the AMF 172 via an N11 interface. Similarly, the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, and downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 13D. The PCF 184 may provide policy rules to control plane nodes such as the AMF 172 and SMF 174, allowing the control plane nodes to enforce these rules. The PCF 184 may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more "virtual" core networks behind the operator's air interface. This involves "slicing" the core network into one or more virtual networks to support different RANs or different service types running across a single RAN. Network slicing enables the operator to create networks customized to provide optimized solutions for different market scenarios which demands diverse requirements, e.g., in the areas of functionality, performance, and isolation.

3GPP has designed the 5G core network to support Network Slicing. Network Slicing is a useful tool that network operators can use to support the diverse set of 5G use cases (e.g., massive IoT, critical communications, V2X, and enhanced mobile broadband) which demand diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 13D, in a network slicing scenario, a WTRU 102*a*, 102*b*, or 102*c* may connect to an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, which serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIG. 13A, FIG. 13C, FIG. 13D, and FIG. 13E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 13A-E are provided by way of example only, and it is understood that the subject matter disclosed and claimed herein may be embodied or implemented in any similar communication system, whether presently defined or defined in the future.

Figure 13E:
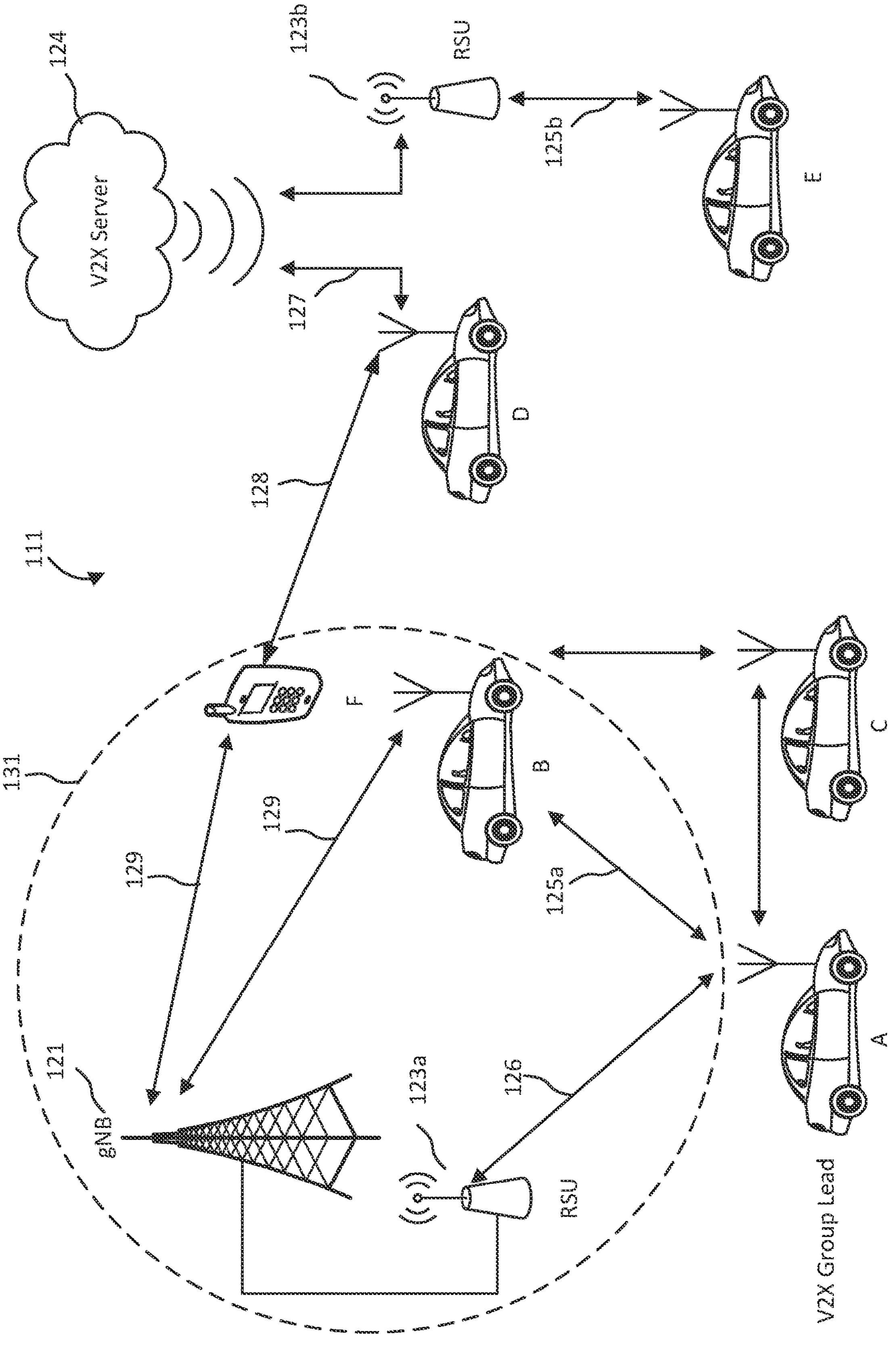
FIG. 13E illustrates another example communications system.

FIG. 13E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123*a* and 123*b*. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 13E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 13E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 13F:
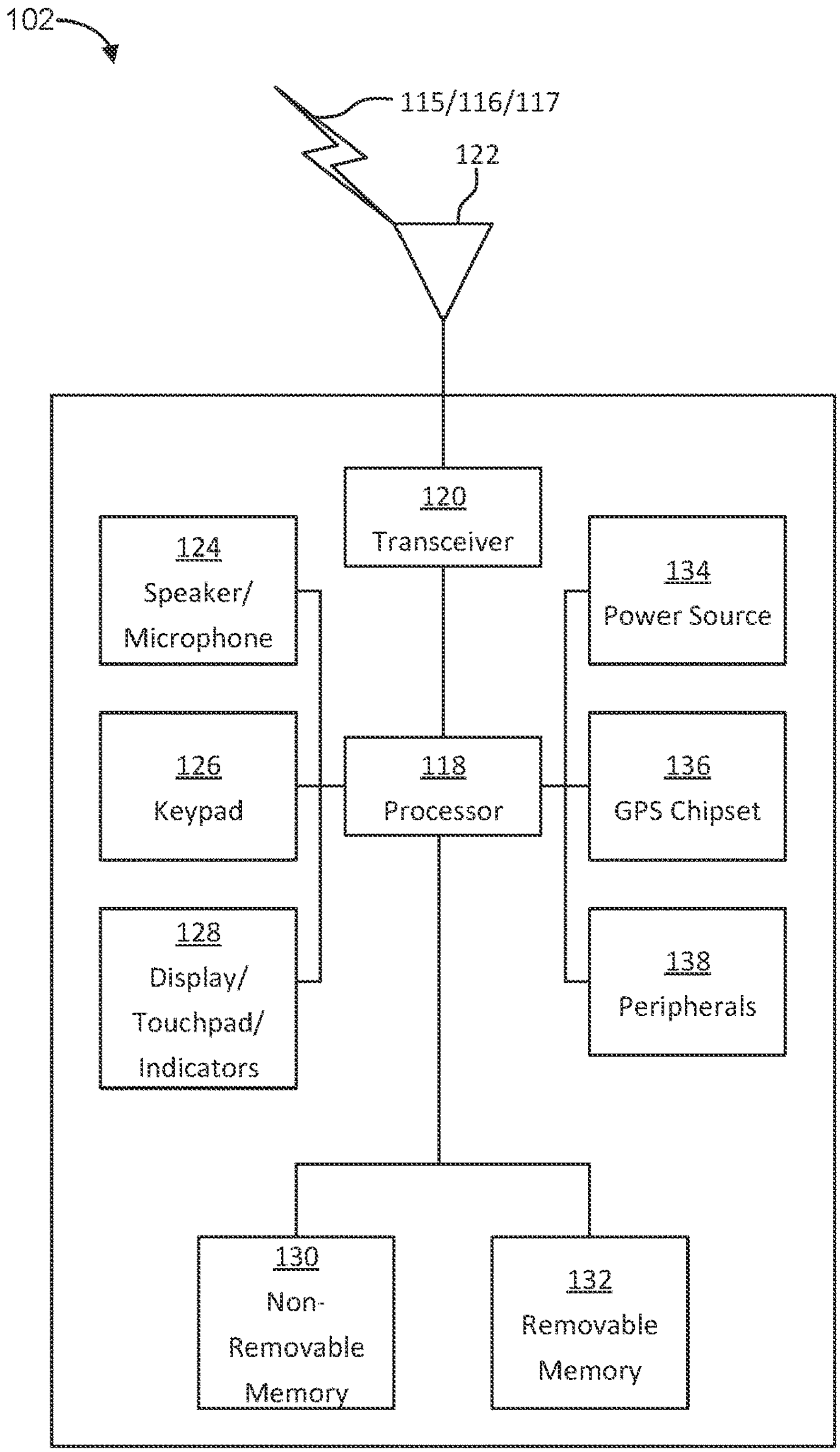
FIG. 13F is a block diagram of an example apparatus or device, such as a WTRU.

FIG. 13F is a block diagram of an example apparatus or device WTRU 102 that may be configured for wireless communications and operations in accordance with the systems, methods, and apparatuses described herein, such as a WTRU 102 of FIGS. 13A-E. As shown in FIG. 13F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, and/or the nodes that base stations 114*a* and 114*b* may represent, such as but not limited to base transceiver station (BTS), a node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 13F and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 13A) over the air interface 115/116/117 or another UE over the air interface 115*d*/116*d*/117*d*. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 13F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or an organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the Cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 13G:
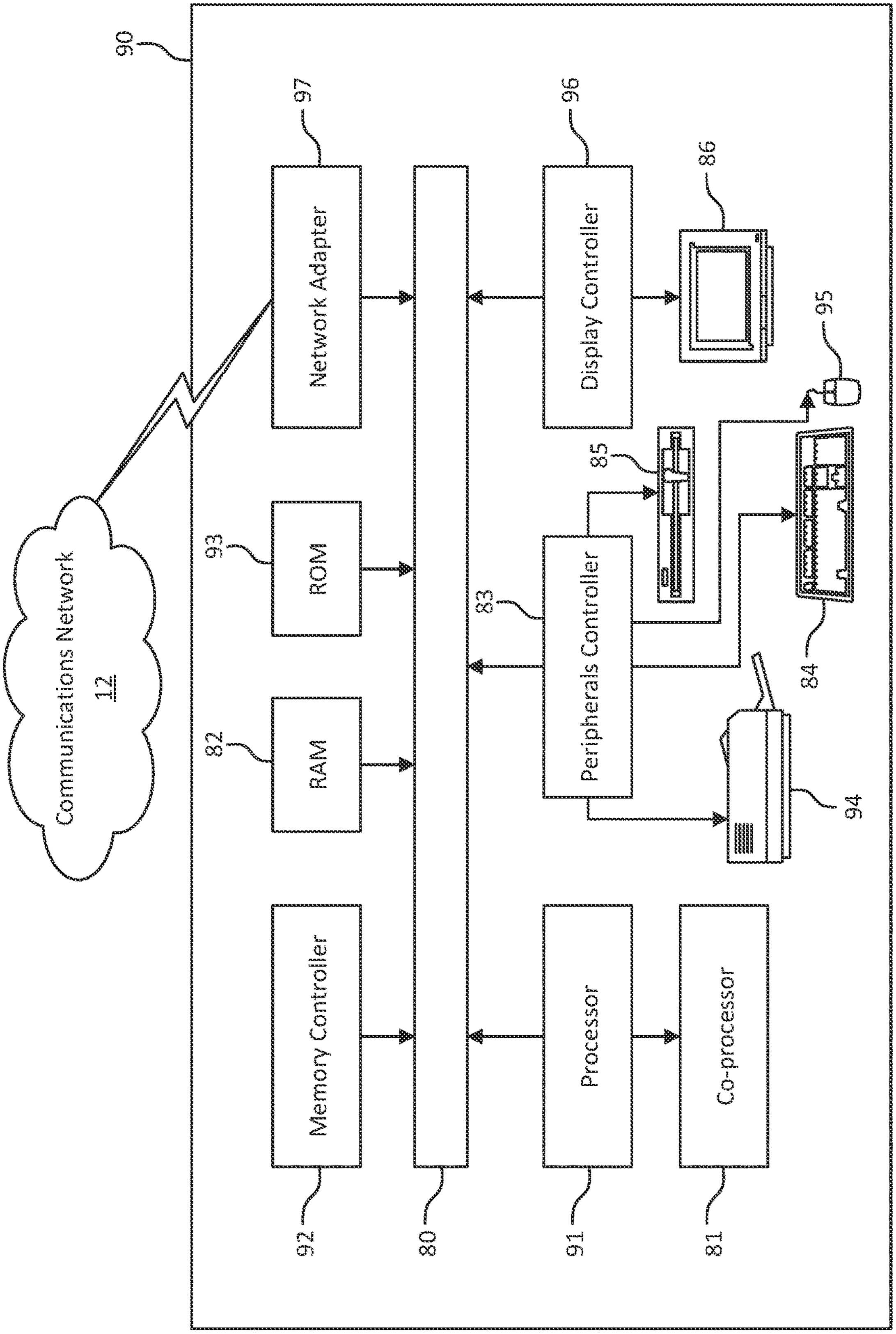
FIG. 13G is a block diagram of an exemplary computing system.

FIG. 13G is a block diagram of an exemplary computing system 90 in which one or more apparatuses of the communications networks illustrated in FIG. 13A, FIG. 13C, FIG. 13D, and FIG. 13E may be embodied, such as certain nodes or functional entities in the RAN 103/104/105, Core Network 106/107/109, PSTN 108, Internet 110, Other Networks 112, or Network Services 113. Computing system 90 may comprise a computer or server, and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses, as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 13A-1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods, and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

APPENDIX

TABLE 1

| Selected Abbreviations | |
|---|---|
| 3GPP | 3rd Generation Partnership Project |
| 5GC | 5G Core Network |
| ACK | ACKnowledgement |
| AF | Application Function |
| AMF | Access and Mobility Management Function |
| AP | Access Point |
| ASICs | Application Specific Integrated Circuits |
| AUSF | Authentication Server Function |
| BSC | Base Station Controller |
| BTS | Base Transceiver Station |
| BWP | Bandwidth Part |
| CBR | Channel Busy Ratio |
| CC | Component Carrier |
| CCG | Component Carrier Group |
| CE | Control Element |
| CRC | Cyclic Redundancy Check |
| CSI | Channel State Information |
| CSI-RS | Channel State Information Reference Signal |
| DCI | Downlink Control Information |
| DMRS | DeModulation Reference Signal |
| DSP | Digital Signal Processor |
| DVD | Digital Versatile Disks |
| EDGE | Enhanced Data rates for GSM Evolution |
| eMBB | Enhanced Mobile Broadband |
| eNodeB | Evolved Home node-B |
| E-UTRA | Evolved UMTS Terrestrial Radio Access |
| eV2X | Enhanced Vehicle-to-Everything |
| FM | Frequency Modulated |
| FPGAs | Field Programmable Gate Array |
| GERAN | GSM EDGE |
| GGSN | Gateway GPRS Support Node |
| gNode B | Next Generation Node-B |
| gNode-B | Next Generation node-B |
| GPS | Global Positioning System |
| GSM | Global System for Mobile communications |
| GUI | Graphical User Interface |
| HARQ | Hybrid Automatic Repeat Request |
| HeNB | Home Evolved node-B |
| HSDPA | High-Speed Downlink Packet Access |
| HSPA | High-Speed Packet Access |
| HSPA+ | Evolved HSPA |
| HSUPA | High-Speed Uplink Packet Access |
| IC | Integrated Circuit |
| IE | Information Element |
| IMS | IP Multimedia Subsystem |
| IP | Internet Protocol |
| IR | Infrared |
| IS-2000 | Interim Standard 2000 |
| IS-856 | Interim Standard 856 |
| IS-95 | Interim Standard 95 |
| LCD | Liquid Crystal Display |
| LTE | Long Term Evolution |
| MAC | Medium Access Control |
| MGW | Media Gateway |
| MIB | Master Information Block |
| MIB-V2X | V2X Master Information Block |
| MIMO | Multiple-Input Multiple Output |
| MME | Mobility Management Gateway |
| mMTC | Massive Machine Type Communications |
| MSC | Mobile Switching Center |
| N3IWF | Non-3GPP Interworking Function |
| N3IWF | Non-3GPP Interworking Management Function |
| NACK | Non-ACKnowledgement |
| NEF | Network Exposure Function |
| New RAT | Next Generation Radio Access Technology |
| NR | New Radio |
| OLED | Organic Light-Emitting Diode |
| PCF | Policy Control Function |
| PCI | Peripheral Component Interconnect |
| PDA | Personal Digital Assistant |
| PDN | Packet Data Network |
| PIR | Packet Inter-Reception |
| POTS | Plain Old Telephone Service |
| PRR | Packet Reception Ratio |
| PSBCH | Physical Sidelink broadcast Channel |
| PSCCH | Physical Sidelink Control Channel |
| PSFCH | Physical Sidelink Feedback Channel |
| PSSCH | Physical Sidelink Shared Channel |
| PSTN | Public Switched Telephone Network |
| PT-RS | Phase-Tracking Reference Signal |

TABLE 1-continued

| Selected Abbreviations | |
|---|---|
| QoS | Quality of Service |
| RAM | Random Access Memory |
| RAN | Radio Access Network |
| RAT | Radio Access Technology |
| RB | Resource Block |
| RBG | Resource Block Group |
| RF | Radio Frequency |
| RG | Residential Gateway |
| RNCs | Radio Network Controllers |
| RNTI | Radio Network Temporary Identifier |
| ROM | Read-only Memory |
| RR | Random Resource |
| RRC | Radio Resource Control |
| RRHs | Remote Radio Heads |
| RSRP | Reference Signal Receive Power |
| RSUs | Roadside Units |
| SCI | Sidelink Control Information |
| SD | Secure Digital |
| SFI | Slot Format Indicator |
| SGSN | Serving GPRS Support Node |
| SI | System Information |
| SIB | System Information Block |
| SIM | Subscriber Identity Module |
| SINR | Signal to Interference and Noise Ratio |
| SL | Sidelink |
| SLSS | Sidelink Synchronization Signal |
| SMF | Session Management Function |
| SMS | Short Message Service |
| SNR | Signal to Noise Ratio |
| S-PSS | Sidelink Primary Synchronization Signals |
| S-RSRP | Sidelink Reference Signal Receive Power |
| S-RSSI | Sidelink Received Signal Strength Indicator |
| S-SSB | Sidelink Synchronization Signal Block |
| S-SSS | Sidelink Secondary Synchronization Signals |
| TB | Transport Block |
| TCP | Transmission Control Protocol |
| TRA | Terrestrial Radio Access |
| TRPs | Transmission and Reception Points |
| UDMF | User Data Management Function |
| UDP | User Datagram Protocol |
| UDR | User Data Repository |
| UE | User Equipment |
| UMTS | Universal Mobile Telecommunications System |
| UPFs | User Plane Functions |
| URLLC | Ultra-Reliable Low-Latency Communication |
| USB | Universal Serial Bus |
| UV | Ultraviolet |
| V2I | Vehicle-to-Infrastructure |
| V2N | Vehicle-to-Network |
| V2P | Vehicle-to-Person |
| V2P | Vehicle-to-Pedestrian |
| V2V | Vehicle-to-Vehicle |
| V2X | Vehicle-to-everything |
| VoIP | Voice Over Internet Protocol |
| WCDMA | Wideband CDMA |
| WiMAX | Worldwide Interoperability for Microwave Access |
| WLAN | Wireless Local Area Network |
| WPAN | Wireless Personal Area Network |
| WTRUs | Wireless Transmit/Receive Units |
| WTRUs | Wireless Transmit/Receive Units |

TABLE 2

Indicator for reception/transmission

| SCI field x - TX/RX Bit IND | SCI field x - TX/RX IND | Rx/Tx |
|---|---|---|
| “1” | TX | Indicated signal/channel is for TX |
| “0” | RX | Indicated signal/channel is for RX |

TABLE 3

Indicator for adding or removing signal/channel from reception

| SCI field x - Bit IND | SCI field x - Add/Remove IND | Signal/Channel to be added or removed from reception |
|---|---|---|
| “1” | Add | Indicated signal/channel is added |
| “0” | Remove | Indicated signal/channel is removed |

What is claimed is:

1. A first apparatus, comprising a processor, communication circuitry, a memory, and computer-executable instructions stored in the memory which, when executed by the processor, cause the first apparatus to:

receive, from a second apparatus, an indication of a sidelink configuration comprising a plurality of sensing types;

receive, from the second apparatus, an indication of an activation of at least one sensing type of the plurality of sensing types;

receive control information indicating a plurality of sensing schemes;

determine, based on the at least one sensing type of the plurality of sensing types, at least one sensing scheme of the plurality of sensing schemes; and perform, based on the at least one sensing type of the plurality of sensing types and the at least one sensing scheme of the plurality of sensing schemes, a sidelink sensing operation.

2. The first apparatus of claim 1, wherein the plurality of sensing types comprises at least one of a random resource selection type, a full sensing type, and a partial sensing type.

3. The first apparatus of claim 2, wherein the indicated plurality of sensing schemes comprises at least one of a contiguous scheme, a periodic-based scheme, a hybrid sensing scheme or a combination thereof.

4. The first apparatus of claim 2, wherein the random resource selection type comprises at least one of a uniform random resource selection or a non-uniform random resource selection.

5. The first apparatus of claim 1, wherein the second apparatus comprises at least one of a wireless transmit/receive unit (WTRU) and a core network.

6. The first apparatus of claim 1, wherein the control information comprises at least one of downlink control information and sidelink control information.

7. The first apparatus of claim 1, wherein the sidelink sensing operation comprises a communication via at least one of a sidelink synchronization signal block (S-SSB), a physical sidelink feedback channel (PSFCH), a physical sidelink control channel demodulation reference signal (PSCCH-DMRS), and a physical sidelink shared channel demodulation reference signal (PSSCH-DMRS).

8. The first apparatus of claim 1, wherein the sidelink configuration comprises at least one of an indication of a function to be enabled for sidelink transmission or an indication of a function to be disabled for sidelink communication.

9. The first apparatus of claim 1, wherein the at least one sensing scheme associated with the sidelink sensing operation is determined by the first apparatus based on operating conditions for the first apparatus.

10. The first apparatus of claim 9, wherein the operating conditions comprise one or more of a channel busy ratio (CBR), a quality of service (QoS), a priority, a traffic type, a service type, a data rate, a signal to noise ratio (SNR), a signal to interference and noise ratio (SINR), and a channel occupancy ratio (CR).

11. A method comprising:

receiving, from an apparatus, an indication of a sidelink communication configuration comprising a plurality of sensing types;

receiving, from the apparatus, an indication of an activation of at least one sensing type of the plurality of sensing types;

receiving control information indicating a plurality of sensing schemes;

determining, based on the at least one sensing type of the plurality of sensing types, at least one sensing scheme of the plurality of sensing schemes; and performing, based on the at least one sensing type of the plurality of sensing types and the at least one sensing scheme of the plurality of sensing schemes, a sidelink sensing operation.

12. The method of claim 11, wherein the plurality of sensing types comprises at least one of a random resource selection type, a full sensing type, and a partial sensing type.

13. The method of claim 12, wherein the indicated plurality of sensing schemes comprises at least one of a contiguous scheme, a periodic-based scheme, a hybrid sensing scheme or a combination thereof.

14. The method of claim 12, wherein the random resource selection type comprises at least one of a uniform random resource selection or a non-uniform random resource selection.

15. The method of claim 11, wherein the apparatus comprises at least one of a wireless transmit/receive unit (WTRU) and a core network.

16. The method of claim 11, wherein the control information comprises at least one of downlink control information and sidelink control information.

17. The method of claim 11, wherein the sidelink sensing operation comprises a communication via at least one of a sidelink synchronization signal block (S-SSB), a physical sidelink feedback channel (PSFCH), a physical sidelink control channel demodulation reference signal (PSCCH-DMRS), and a physical sidelink shared channel demodulation reference signal (PSSCH-DMRS).

18. The method of claim 11, wherein the sidelink communication configuration comprises at least one of an indication of a function to be enabled for sidelink transmission or an indication of a function to be disabled for sidelink communication.

19. The method of claim 11, wherein the determining of the at least one sensing scheme associated with performing the sidelink sensing operation comprises determining operating conditions.

20. The method of claim 19, wherein the operating conditions comprise one or more of a channel busy ratio (CBR), a quality of service (QoS), a priority, a traffic type, a service type, a data rate, a signal to noise ratio (SNR), a signal to interference and noise ratio (SINR), and a channel occupancy ratio (CR).

* * * * *